United States Patent
Jayakumar et al.

(10) Patent No.: US 9,305,129 B2
(45) Date of Patent: Apr. 5, 2016

(54) SYSTEM FOR AND METHOD OF TUNING CLOCK NETWORKS CONSTRUCTED USING VARIABLE DRIVE-STRENGTH CLOCK INVERTERS WITH VARIABLE DRIVE-STRENGTH CLOCK DRIVERS BUILT OUT OF A SMALLER SUBSET OF BASE CELLS

(71) Applicant: XPLIANT, Inc., San Jose, CA (US)

(72) Inventors: Nikhil Jayakumar, Sunnyvale, CA (US); Vivek Trivedi, Fremont, CA (US); Vasant K. Palisetti, Santa Clara, CA (US); Bhagavati R. Mula, San Jose, CA (US); Daman Ahluwalia, Los Gatos, CA (US); Amir H. Motamedi, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 202 days.

(21) Appl. No.: 14/141,104

(22) Filed: Dec. 26, 2013

(65) Prior Publication Data

US 2015/0186583 A1    Jul. 2, 2015

(51) Int. Cl.
    *G06F 17/50* (2006.01)

(52) U.S. Cl.
    CPC ........ *G06F 17/5072* (2013.01); *G06F 17/5009* (2013.01); *G06F 17/5077* (2013.01); *G06F 17/5031* (2013.01); *G06F 2217/84* (2013.01)

(58) Field of Classification Search
    None
    See application file for complete search history.

(56) References Cited

U.S. PATENT DOCUMENTS

| | | | | |
|---|---|---|---|---|
| 5,914,625 A * | 6/1999 | Shirata | ............ | H01L 27/11803 257/E27.107 |
| 5,977,810 A * | 11/1999 | Shirata | ............ | H01L 27/11803 257/E27.107 |
| 6,166,564 A * | 12/2000 | Rosen | ............ | H03K 19/0963 326/93 |
| 6,434,731 B1 * | 8/2002 | Brennan | ............ | G06F 1/10 716/122 |
| 6,574,781 B1 * | 6/2003 | Harada | ............ | G06F 17/5045 716/114 |
| 6,609,241 B2 * | 8/2003 | Yonemori | ............ | G06F 17/5077 716/114 |
| 6,629,298 B1 * | 9/2003 | Camporese | ............ | G06F 17/5022 716/113 |
| 6,698,006 B1 * | 2/2004 | Srinivasan | ............ | G06F 1/10 716/114 |
| 6,763,513 B1 * | 7/2004 | Chang | ............ | G06F 17/505 716/114 |
| 6,951,002 B2 * | 9/2005 | Clabes | ............ | G06F 17/5068 716/115 |
| 6,981,233 B2 * | 12/2005 | Chang | ............ | G06F 17/5045 716/113 |
| 7,810,061 B2 * | 10/2010 | Minonne | ............ | G06F 17/505 716/113 |
| 8,629,548 B1 * | 1/2014 | Andreev | ............ | G06F 1/10 257/691 |

(Continued)

*Primary Examiner* — Leigh Garbowski
(74) *Attorney, Agent, or Firm* — Haverstock & Owens LLP

(57) ABSTRACT

Clock networks constructed with variable drive strength clock drivers are prepared for tuning. The clock drivers are built from a smaller set of base standard cells. Locations of the input and output netlists of the macrocells are marked and reserved even through the extraction process. The macrocells are able to be flattened, generating a netlist with the base cells, and recombined during circuit simulation, thereby reducing the number of iterations, making the tuning flow more efficient. The clock network is initially tuned by adding or removing cross-links in the mesh to balance capacitive loads on each driver of the clock mesh.

30 Claims, 18 Drawing Sheets

(56) References Cited

U.S. PATENT DOCUMENTS

| | | | |
|---|---|---|---|
| 2004/0168140 A1* | 8/2004 | Chang | G06F 17/5045 716/113 |
| 2006/0080632 A1* | 4/2006 | Ng | G06F 17/5068 716/116 |
| 2008/0229266 A1* | 9/2008 | Bueti | G06F 17/5045 716/113 |
| 2009/0195274 A1* | 8/2009 | Ohyabu | G06F 1/10 327/153 |
| 2010/0023898 A1* | 1/2010 | Nomura | G06F 17/5045 716/136 |
| 2011/0046937 A1* | 2/2011 | Kanno | G06F 17/5031 703/19 |
| 2012/0216168 A1 | 8/2012 | Buechner et al. | |
| 2012/0266120 A1 | 10/2012 | Buechner et al. | |
| 2013/0020707 A1 | 1/2013 | Or-bach et al. | |
| 2013/0043923 A1 | 2/2013 | Gasper et al. | |
| 2013/0047127 A1* | 2/2013 | Arunachalam | G06F 17/5072 716/103 |
| 2013/0069703 A1 | 3/2013 | Gasper et al. | |
| 2014/0028348 A1 | 1/2014 | Andreev et al. | |
| 2015/0186583 A1 | 7/2015 | Jayakumar et al. | |
| 2015/0186589 A1 | 7/2015 | Jayakumar et al. | |

* cited by examiner

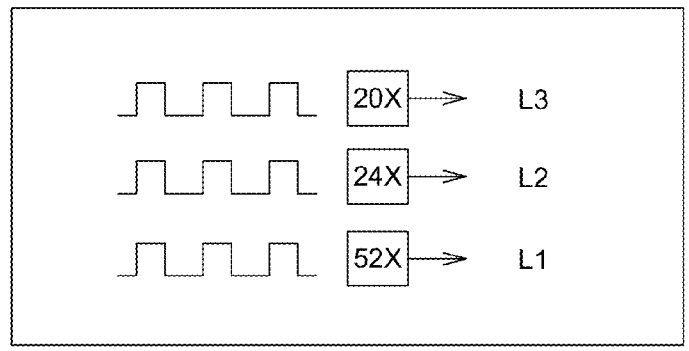
Fig. 2
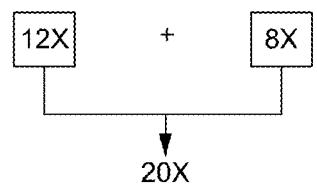
Fig. 3A
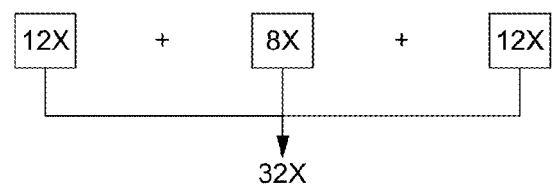
Fig. 3B
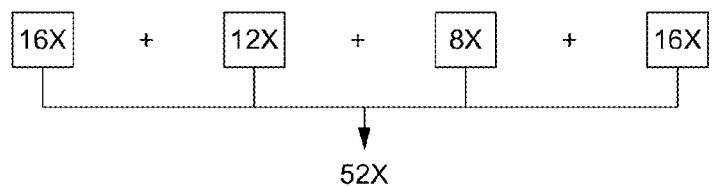
Fig. 3C
Fig. 3D

```
module xp_ckinvx0 ( A ) ;
input A ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(float4) ) ;
stdcell_ckinv_x16  xinv5 ( .A(A), .Q(float5) ) ;
endmodule // xp_ckinvx0 module xp_ckinvx8 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(Z) ) ;
stdcell_ckinv_x12  xinv4 ( .A(A), .Q(float4) ) ;
stdcell_ckinv_x16  xinv5 ( .A(A), .Q(float5) ) ;
endmodule // xp_ckinvx8 module xp_ckinvx12 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(Z) ) ;
stdcell_ckinv_x16  xinv5 ( .A(A), .Q(float5) ) ;
endmodule // xp_ckinvx12 module xp_ckinvx16 ( A , Z ) ;
input A ;
output Z ;
stdcell_ckinv_x16  xinv1 ( .A(A), .Q(float1) ) ;
stdcell_ckinv_x12  xinv2 ( .A(A), .Q(float2) ) ;
stdcell_ckinv_x8   xinv3 ( .A(A), .Q(float3) ) ;
stdcell_ckinv_x12  xinv4 ( .A(A), .Q(float4) ) ;
stdcell_ckinv_x16  xinv5 ( .A(A), .Q(Z) ) ;
endmodule // xp_ckinvx16 module xp_ckinvx20 ( A , Z ) ;
input A ;
output Z ;
stdcell_ckinv_x16  xinv1 ( .A(A), .Q(flqat1) ) ;
stdcell_ckinv_x12  xinv2 ( .A(A), .Q(float2) ) ;
```

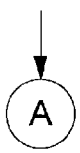

Fig. 9A

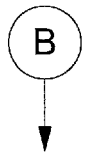

```
endmodule // xp_ckinvx44 module xp_ckinvx48 ( A , Z ) ;
input A ;
output Z ;
stdcell_ckinv_x16   xinv1 ( .A(A), .Q(float1) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx48 module xp_ckinvx52 ( A , Z ) ;
input A ;
output Z ;
stdcell_ckinv_x16   xinv1 ( .A(A), .Q(Z) ) ;
stdcell_ckinv_x12   xinv2 ( .A(A), .Q(float2) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx52 module xp_ckinvx56 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(float3) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx56 module xp_ckinvx64 ( A , Z ) ;
input A ;
output Z ;
stdcell_ckinv_x16   xinv1 ( .A(A), .Q(Z) ) ;
stdcell_ckinv_x12   xinv2 ( .A(A), .Q(Z) ) ;
stdcell_ckinv_x8    xinv3 ( .A(A), .Q(Z) ) ;
stdcell_ckinv_x12   xinv4 ( .A(A), .Q(Z) ) ;
stdcell_ckinv_x16   xinv5 ( .A(A), .Q(Z) ) ;
endmodule // xp_ckinvx64
```

Fig. 9C

```
/* begin Verilog netlist of clock binary clock tree with cross-links */
module clkstationSample ( clk_L5, clk_L4, clk_L3, clk ) ;

input clk_L5;
   output clk_L4;
   output clk_L3;
   output clk;

xp_ckinvx32 xL2_3352p200_2p600 ( .A(clk_L3), .Z(clk) ) ;
xp_ckinvx32 xL2_3405p000_2p600 ( .A(clk_L3), .Z(clk) ) ;
xp_ckinvx32 xL2_3457p800_2p600 ( .A(clk_L3), .Z(clk) ) ;
xp_ckinvx32 xL2_3510p600_2p600 ( .A(clk_L3), .Z(clk) ) ;
xp_ckinvx32 xL2_3563p400_2p600 ( .A(clk_L3), .Z(clk) ) ;
xp_ckinvx32 xL2_3616p200_2p600 ( .A(clk_L3), .Z(clk) ) ;
xp_ckinvx32 xL2_3669p000_2p600 ( .A(clk_L3), .Z(clk) ) ;
xp_ckinvx32 xL2_3721p800_2p600 ( .A(clk_L3), .Z(clk) ) ;
xp_ckinvx32 xL2_3774p600_2p600 ( .A(clk_L3), .Z(clk) ) ;
xp_ckinvx32 xL2_3827p400_2p600 ( .A(clk_L3), .Z(clk) ) ;
xp_ckinvx32 xL2_3880p200_2p600 ( .A(clk_L3), .Z(clk) ) ;
xp_ckinvx32 xL2_3933p000_2p600 ( .A(clk_L3), .Z(clk) ) ;
xp_ckinvx32 xL2_3985p800_2p600 ( .A(clk_L3), .Z(clk) ) ;
xp_ckinvx32 xL2_4038p600_2p600 ( .A(clk_L3), .Z(clk) ) ;
xp_ckinvx32 xL2_4091p400_2p600 ( .A(clk_L3), .Z(clk) ) ;
xp_ckinvx32 xL2_4144p200_2p600 ( .A(clk_L3), .Z(clk) ) ;
xp_ckinvx32 xL2_4197p000_2p600 ( .A(clk_L3), .Z(clk) ) ;
xp_ckinvx32 xL2_4249p800_2p600 ( .A(clk_L3), .Z(clk) ) ;
xp_ckinvx32 xL2_4302p600_2p600 ( .A(clk_L3), .Z(clk) ) ;
xp_ckinvx32 xL2_4355p400_2p600 ( .A(clk_L3), .Z(clk) ) ;
xp_ckinvx32 xL2_4408p200_2p600 ( .A(clk_L3), .Z(clk) ) ;
xp_ckinvx32 xL2_4461p000_2p600 ( .A(clk_L3), .Z(clk) ) ;
xp_ckinvx32 xL2_4513p800_2p600 ( .A(clk_L3), .Z(clk) ) ;
xp_ckinvx32 xL2_4566p600_2p600 ( .A(clk_L3), .Z(clk) ) ;
xp_ckinvx32 xL2_4619p400_2p600 ( .A(clk_L3), .Z(clk) ) ;
xp_ckinvx32 xL2_4672p200_2p600 ( .A(clk_L3), .Z(clk) ) ;
xp_ckinvx32 xL2_4725p000_2p600 ( .A(clk_L3), .Z(clk) ) ;
xp_ckinvx32 xL2_4777p800_2p600 ( .A(clk_L3), .Z(clk) ) ;
xp_ckinvx32 xL2_4830p600_2p600 ( .A(clk_L3), .Z(clk) ) ;
xp_ckinvx32 xL2_4883p400_2p600 ( .A(clk_L3), .Z(clk) ) ;
xp_ckinvx32 xL2_4936p200_2p600 ( .A(clk_L3), .Z(clk) ) ;
xp_ckinvx32 xL2_4989p000_2p600 ( .A(clk_L3), .Z(clk) ) ;
xp_ckinvx32 xL2_5041p800_2p600 ( .A(clk_L3), .Z(clk) ) ;
xp_ckinvx32 xL2_5094p600_2p600 ( .A(clk_L3), .Z(clk) ) ;
xp_ckinvx32 xL2_5147p400_2p600 ( .A(clk_L3), .Z(clk) ) ;
xp_ckinvx32 xL2_5200p200_2p600 ( .A(clk_L3), .Z(clk) ) ;
```

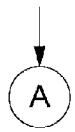

SYSTEM FOR AND METHOD OF TUNING CLOCK NETWORKS CONSTRUCTED USING VARIABLE DRIVE-STRENGTH CLOCK INVERTERS WITH VARIABLE DRIVE-STRENGTH CLOCK DRIVERS BUILT OUT OF A SMALLER SUBSET OF BASE CELLS

FIELD OF THE INVENTION

This invention relates to integrated circuits. More particularly, this invention relates to clock distribution networks on semiconductor devices.

BACKGROUND OF THE INVENTION

For a semiconductor device to function properly, it must distribute clock signals to its parallel "sequential elements," such as flip-flops, latches, and memory, at approximately the same time. When clock signals arrive at these parallel elements at different times, the resulting "clock skew" can cause a variety of problems, including setup and hold violations, which can jeopardize the integrity of data transmitted along the device.

Large-scale semiconductor devices reduce skew by using clock distribution networks to distribute clock signals to the elements on the device. To ensure that the rise times and fall times of the clock signals meet design requirements, CMOS inverters or buffers are inserted at regular intervals. (Because inverters and buffers have similar functions in clock distribution networks, these terms are used interchangeably in this application and are also referred to as clock-drivers or clock-driving elements.) The network may diverge at multiple points. This divergence of the clock network and the insertion of CMOS inverters in the clock cause the clock skew to increase. The clock skew can increase for other reasons, such as structural problems, variations in loads along the clock distribution network, variations in process, voltages, or temperature of the inverters, and other effects in the interconnects in the clock distribution network.

One structure used to reduce clock skew is a clock mesh, which introduces interconnect elements, called cross-links, to short outputs of the inverters in the clock distribution network. These cross-links reduce the delay of the clock signals between clock-driving elements, thereby reducing clock skew, though at the expense of short-circuit power. A second structure used to reduce clock skew is a hybrid-tree mesh, such as the hybrid-tree mesh 100 of FIGS. 1A-B. The mesh portion of the hybrid-tree mesh 100, shown in FIG. 1A, includes a spine 110 supporting ribs 120 and 130, inverters 121 on the rib 120, cross-links 121 and 122 coupling clock-driving elements on the ribs 120 and 130, and a non-rectilinear clock mesh region 140. While FIG. 1A shows cross-links between elements along the ribs 120 and 130, in other structures, cross-links are inserted at other locations or combinations of locations in the clock-distribution network, such as within the clock-distribution network, at its end, or both. The mesh portion 100 is in turn driven by a hierarchical binary tree structure 150 shown in FIG. 1B, in which a clock-driving element 145 (level L2) drives 4 clock-driving elements 120A-ED (level L1), and a clock-driving element 160 (level L3) drives element 145 and other elements on level L2.

While FIGS. 1A-B show several inverters, ribs, and cross-links to simplify the drawings, clock distribution networks typically have hundreds of thousands of these components directing clock signals to thousands of clock-receiving (sequential) elements. These elements represent different loads to the clock-distribution network, resulting in higher skew, as do other structures such as the non-rectilinear component 140 in FIG. 1A.

In order to reduce short-circuit power, it is important to keep the skew between the inputs of inverters whose outputs are shorted as low as possible. Thus, it is important to reduce the structural skew of the clock distribution network at design time. It may not be possible to guarantee that inverters of a clock distribution network whose outputs are shorted with a cross-link have the same load characteristics. Hence, a tune-able clock inverter is required to reduce the structural skew. The clock inverters are tuned so that those that drive large loads have large drive strengths and those that drive smaller loads have smaller driver strengths. In the last stage of a hybrid tree-mesh clock distribution network, the loads can vary substantially due to various reasons including variation in flip-flop density and non-rectilinear clock mesh regions.

A tune-able clock inverter may be constructed by combining multiple base cells and connecting/disconnecting their outputs to form different effective drive strengths. This way, the input capacitance stays the same and only the output drive strength changes, thus making tuning of the clock network easier and more predictable. One way to make a tune-able clock inverter is to combine them to make one macrocell and then use that macrocell where required. One drawback to this approach is that this macrocell is treated by Electronic Design Automation (EDA) tools as a single cell through all levels of the physical design. This may require an accurate transistor level extraction and characterization of the macrocell. Also, in order to maintain the macrocell as a single cell, timing DBs, physical cell views, LVS netlists, and other collateral for this cell must be generated. However, breaking macrocells up into their component base cells can make tuning of the clock distribution network that uses these macrocells extremely difficult.

BRIEF SUMMARY OF THE INVENTION

In a first aspect of the invention, a method of preparing an integrated circuit for tuning includes generating a collection of macrocells instantiated in the integrated circuit design, wherein the integrated circuit design contains drivers for driving capacitive loads on the integrated circuit; choosing locations for input and output netlists of each of the macrocells and generating terminals marking the locations; determining names of the terminals and pins for the macrocells; and initially tuning the integrated circuit by balancing a capacitive load on the drivers according to pre-determined criteria.

In one embodiment, the method also includes opening a physical DB of the integrated circuit using a place-and-route (PnR) tool. The integrated circuit includes a clock network containing cross-links. As some examples, the clock network includes a clock mesh, a clock-tree mesh, or a hybrid tree-mesh. The clock network is tuned by adding the cross-links, removing the cross-links, or both.

In one embodiment, each of the macrocells contains only one or more corresponding standard-size base cells. In one embodiment, the method also includes flattening each of the macrocells to generate a netlist containing the corresponding base cells, and tuning the integrated circuit includes recombining the base cells into the corresponding macrocells during circuit simulation using the terminal names and the names of the macrocell pins. Preferably, the terminal names and the names of the macrocells are stored in a file. Alternatively, the terminal names and macrocell pin names are embedded in the corresponding terminal names. In one embodiment, physical location information of a terminal is also embedded in a corresponding terminal name.

In one embodiment, the method also includes introducing stimulus to a netlist of the integrated circuit and measuring circuit parameters at inputs and outputs of the macrocells. The tuning includes equalizing one or more parameters measured during simulation of the integrated circuit. As some examples, the one or more parameters include delay, slew, current, charge, or any combination thereof.

Preferably, the tuning includes resizing the macrocells until an exit criterion is met. Some examples of exit criterion include a size of the macrocells equals a target size, measured slew is within a pre-determined range, a number of resizings has reached a pre-determined limit, or any combination thereof. In one embodiment, resizing is based on a formula New_size=Current_size*(1+(Current_slew−Target_slew)/(Target_slew)), wherein New_size is a new size of a macrocell, Current_size a current size of the macrocell, Current_slew is a current slew, and Target_slew is a pre-determined target slew. In another embodiment, resizing is based on a formula New_size=Current_size*(1+(Current_slew−Target_slew)/(Current_slew)), wherein New_size is a new size of a macrocell, Current_size a current size of the macrocell, Current_Slew is a current slew, and Target_slew is a pre-determined target slew.

In a second aspect, a system for tuning an integrated circuit design includes a processor, a synthesis module configured to generate a collection of macrocells instantiated in the integrated circuit design, wherein the integrated circuit design contains drivers for driving capacitive loads on the integrated circuit; a place-and-route module configured to choose locations for input and output nets of each of the macrocells, generate terminals marking the locations, and determine names of the terminals and pins for the macrocells; and a verification module configured to tune the integrated circuit to balance a capacitive load on the drivers according to pre-determined criteria. The system also includes a macrocell library coupled to the synthesis module, wherein the macrocell library contains only standard-size macrocells. In one embodiment, the integrated circuit comprises a clock network containing cross-links. As some examples, the clock network includes a clock mesh, a clock-tree mesh, or a hybrid tree-mesh.

In a third aspect of the invention, a semiconductor device with a clock-distribution network thereon comprises clock-driving elements formed from macrocells comprising only standard-size base cells, wherein, for each of the macrocells, the corresponding base cells are arranged according to a pre-determined arrangement relative to the macrocell, and further wherein the macrocells have been re-sized during simulation according to one or more circuit simulation parameters. As some examples, the one or more circuit simulation parameters include delay, slew, current, charge, or any combination thereof. As some examples, the clock-distribution network includes a clock tree, a clock mesh, or a hybrid tree-mesh.

BRIEF DESCRIPTION OF THE SEVERAL VIEWS OF THE DRAWINGS

The following figures are used to illustrate embodiments of the invention. In all the figures, the same label refers to the identical or a similar element.

FIG. 2 schematically shows a portion of a clock distribution network driving sequential elements that present different loads to the network.

FIGS. 3A-D are diagrams used to illustrate how standard-size cells are combined to tune a clock-distribution network in accordance with the principles of the invention.

FIGS. 9A-C and 10A-B are Verilog netlists illustrating how tune-able clock inverters are constructed in accordance with one embodiment of the invention.

DETAILED DESCRIPTION OF THE INVENTION

Figure 1A:
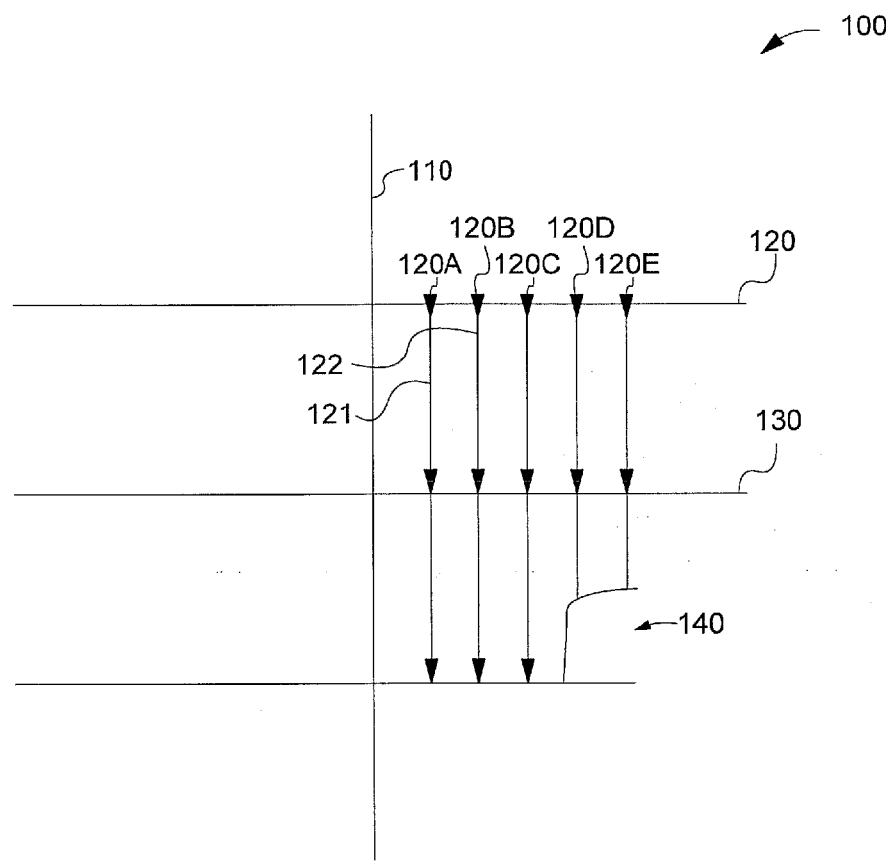
FIGS. 1A-B are high-level diagrams of portions of a prior art mesh-tree hybrid clock distribution network.

In accordance with the principles of the invention, a soft-macrocell of a tune-able clock driver is generated at the RTL stage of an electronic design automation (EDA) process. All tools in the EDA process flow break the cell into its component base cells, thus eliminating the need to maintain timing DBs, physical cell views, LVS netlists, and other collateral for the macrocell.

In accordance with the invention, a soft-macro of the tune-able clock drivers is generated, but the macrocell is not maintained through the flow. A soft-macro is generated at the RTL stage and tools used in the flow to break up the cell into its component base cells, thus eliminating the need to maintain timing DBs, physical cell views, LVS netlists and other collateral for the macrocell.

The following description first explains how macrocells from a standard-cell library are combined to generate a tune-able range of drive strength signals for driving clock-receiving elements in a clock distribution network. Second, the description explains how those macrocells are placed and routed. Third, this description explains how these clock networks built of macrocells are tuned, all in accordance with the principles of the invention.

Generating Clock-Distribution Networks Using Only Standard-Sized Macrocells

In accordance with the principles of the invention, a semiconductor-device clock-distribution network uses only standard sized inverters, regardless of the drive strengths needed to drive sequential (clock-receiving) elements on the device. Because custom-sized inverters do not have to be fabricated or purchased from third parties, the design process is less expensive than prior art processes. Furthermore, because these standard-sized inverters have been more thoroughly tested and function more predictably, the time for debugging semiconductor devices using these clock distribution networks is reduced, allowing products to be brought to market more quickly.

As one example, during the electronic design automation, a drive strength for a clock-receiving component is determined. The system determines a combination of the custom-sized CMOS inverters, such that their combined drive strength is large enough to drive the sequential element yet small enough to minimize short-circuit power. The combination of custom-sized components is then simulated and, later, the corresponding inverters are placed and routed to form the physical semiconductor device. The resulting clock inverter drives the various loads on a single semiconductor device while maintaining low skew and has a range of drive strengths and enough granularity to maintain a low skew.

In one embodiment, the standard sized inverters (or other "clock-driving" elements) have drive strengths of 0×, 8×, 12×, and 16×. These inverters are able to be combined to form tune-able inverters of drive strengths 0×, 8×, 12×, 16×, 20× (8×+12×), 24× (12×+12×), 28× (20×+8×), 32× (16×+16×), 36× (8×+12×+16×), 40× (8×+16×+6×), 44× (12×+16×+16×), 48× (16×+16×+16×), 52× (8×+12×+16×+16), 56× (8×+16×+16×+16), and 64× (16×+16×+16×+16). It will be appreciated that other inverter drive strengths are able to be combined to form these values, for example, a 24× drive strength is able to be formed by 3 inverters with 8× drive strengths. Preferably, the drive strength is determined by combining the fewest numbers of inverters. In other words, in one example, a drive strength of D is determined by combining inverters according to Equation (1):

$$DX = 8 \times *a + 12 \times *b + 16_{x*c} \qquad \text{Equation (1)}$$

where a+b+c (the total number of inverters) is minimized. In accordance with the principles of the invention, using other design constraints, other selection criteria are able to be used.

By combining inverters into various groups, a distributed clock network is able to generate "ganged" inverters having a pre-determined range of values. In this example, clock inverters are able to have any value in the range 0× (e.g., where a dummy load is needed merely for symmetry) to 64×, with the values 0×, 8×, 12×, 16× to 56×, in 4× increments, and 64×. It will be appreciated that using different standard-sized inverters, other ranges of signal strengths in other increments are able to be produced.

FIG. 2 schematically illustrates a portion of a distributed clock network 200 driving 3 different loads, L1, L2, and L3. The clock network 200 is able to form part of any semiconductor device, such as a microprocessor. During the synthesis of the semiconductor device 200, the load values L1, L2, and L3 are determined. In this example, the values L1, L2, and L3 are different from each other because of variations in flip-flop density and non-rectilinear clock meshes. Those skilled in the art will recognize that the loads are able to vary for other reasons.

The load L3 requires a clock signal with a 20× drive strength, the load L2 requires a clock signal with a 24× drive strength, and the load L1 requires a clock signal with a 52× drive strength. The inverters of the clock distribution network are fabricated using only standard-sized cells, of drive strength values 8×, 12×, and 16×. The clock signal with the 20× drive strength is fabricated by combining or "ganging" two standard-size inverters with drive strengths of 8× and 12×, respectively. The clock signal with the 24× drive strength is fabricated by combining two standard-size inverters with drive strengths of 8× and 16×, respectively. The clock signal with the 52× drive strength is fabricated by combining four standard-sized inverters with drive strengths of 16×, 16×, 12×, and 8×, respectively. In this example, the synthesis step is followed by simulation, timing analysis, placement and routing, extraction, and verification steps.

FIGS. 3A-D illustrate how a standard cell library of only 3 cells, with drive strengths of 8×, 12×, and 16× (FIG. 3A) are able to be combined to produce cells with drive strengths of 20× (FIG. 3B), 32× (FIG. 3C), and 52× (FIG. 3D), to give only a few examples of the possible combinations.

Figure 1B:
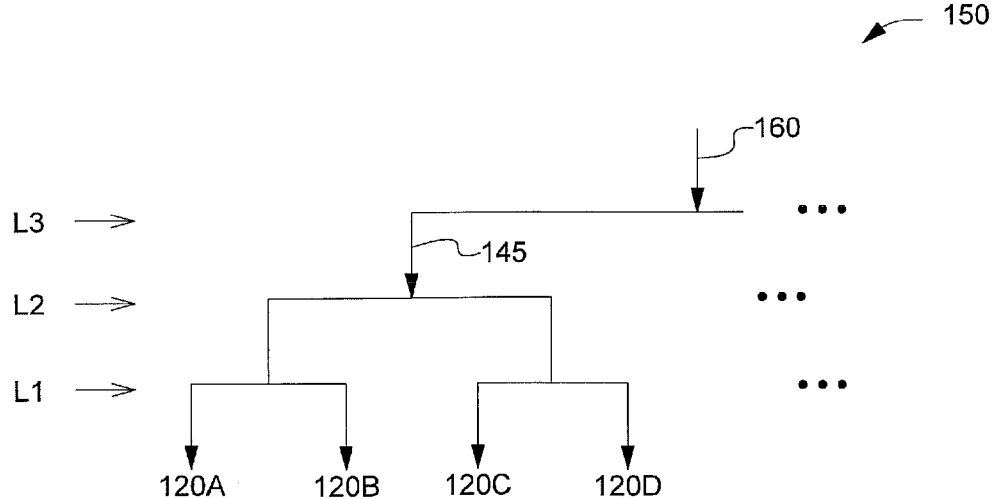

In one embodiment, the standard-size inverters are all fabricated on one or more layers of a semiconductor device. The inverters are combined or "tuned" by VIA programming, that is, by adding or removing vias that electrically couple the inverters together and to an output pin that drives the sequential elements. Referring to FIG. 1B, tuning in this way does not affect the upstream elements (e.g., 145 and 160) in the clock distribution network.

In one embodiment, the base cells are combined to produce a tune-able clock inverter using "VIA34 programming." The base cells are placed on adjacent rows of the semiconductor device, one on top of another, and drawing in the metal layer 4 (M4) of the semiconductor device straps connected to the output net. The M4 straps are, in turn, able to be connected through higher metal layers. Thus, the base cell's output is able to be connected to or disconnected from the output net by respectively inserting or removing a via from the metal 3 layer (M3) to M4. All other metal layers and vias are left untouched. Thus, the drive strength of the clock inverters is able to be tuned merely by adding or removing a via (VIA34) between two layers (M3 and M4).

Figure 4:
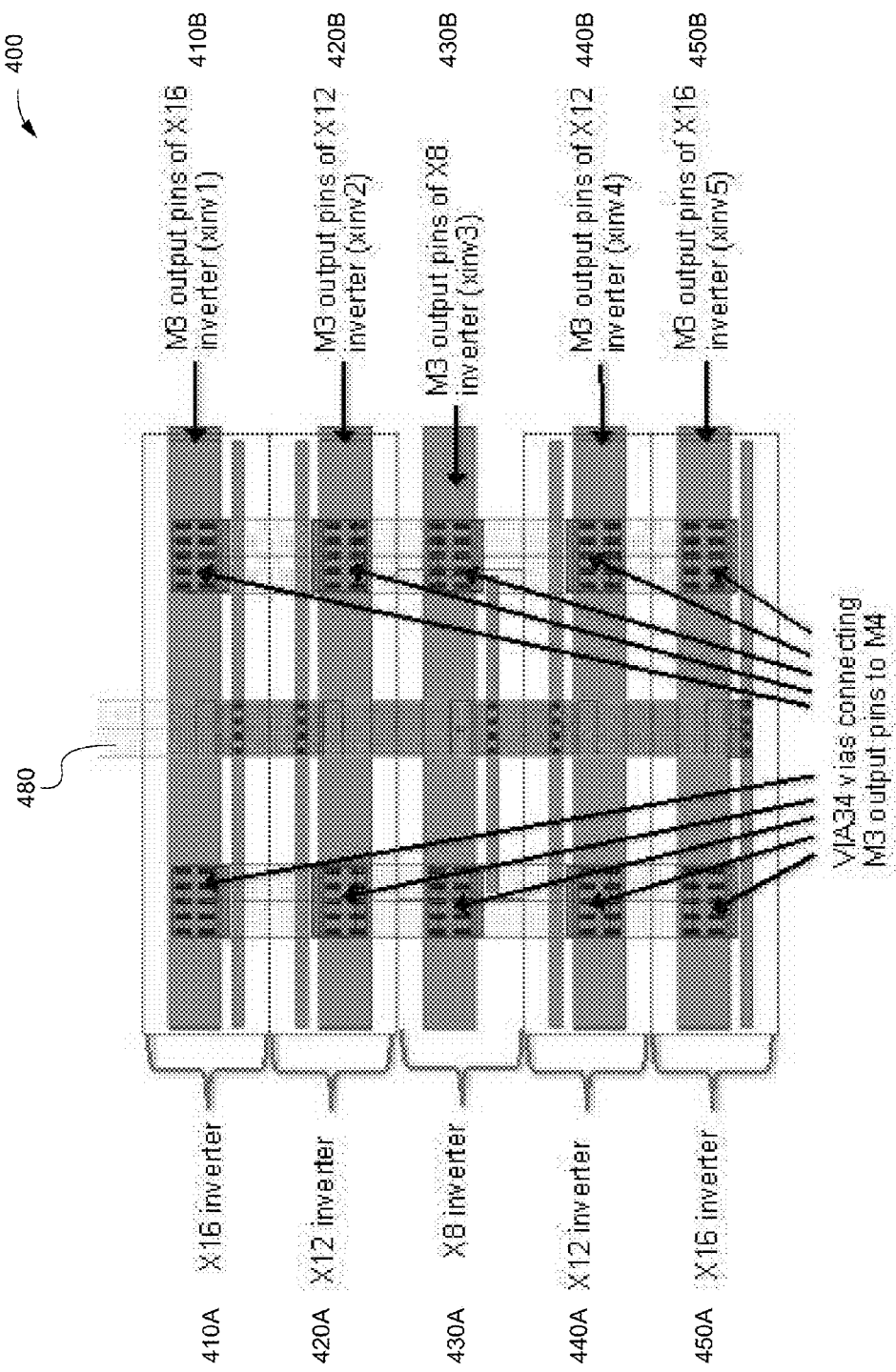
FIGS. 4-6 are semiconductor device layouts showing programming of 64×, 32×, and 0× strength clock inverters, respectively, in accordance with embodiments of the invention.
Figure 5:
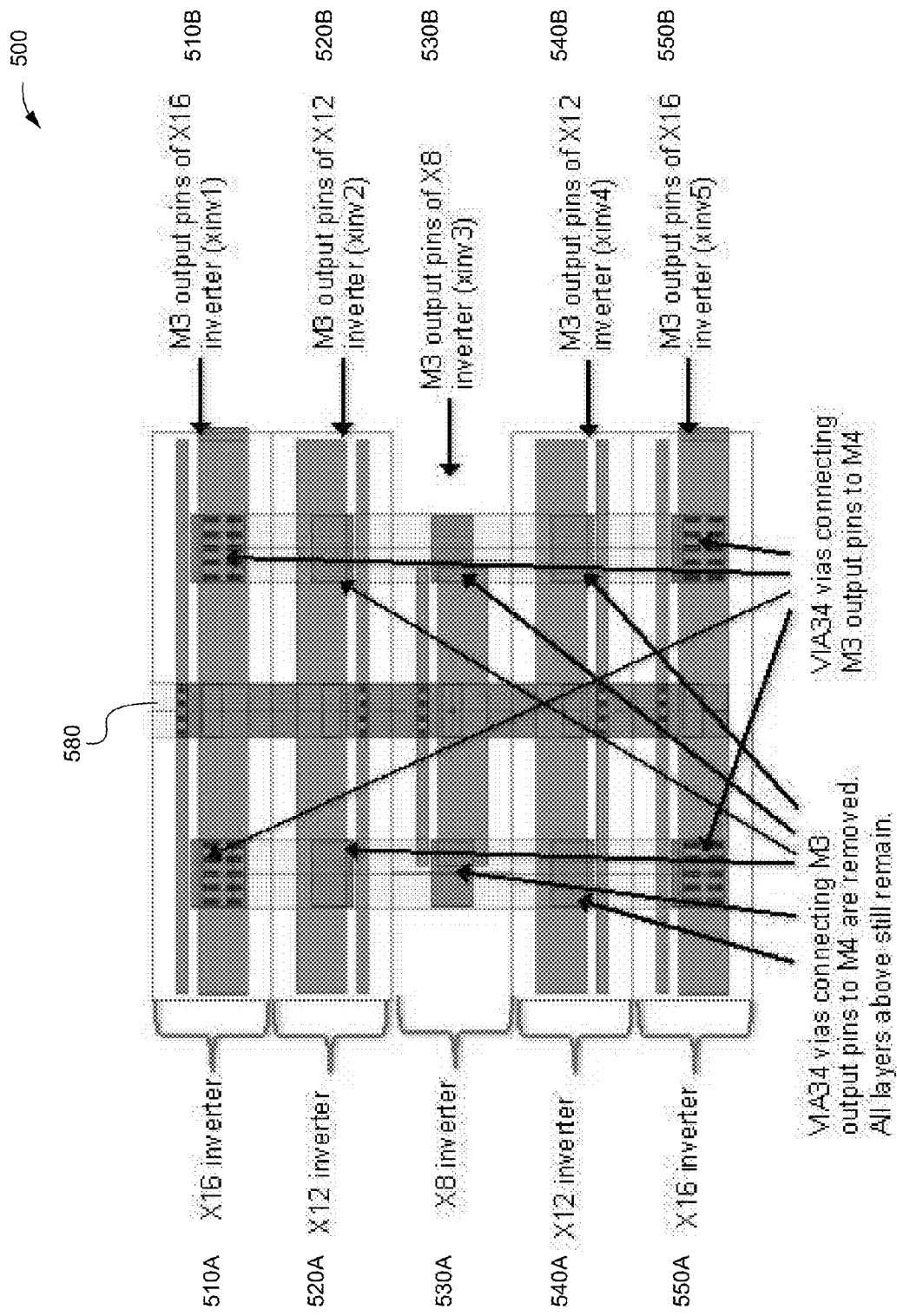
Figure 6:
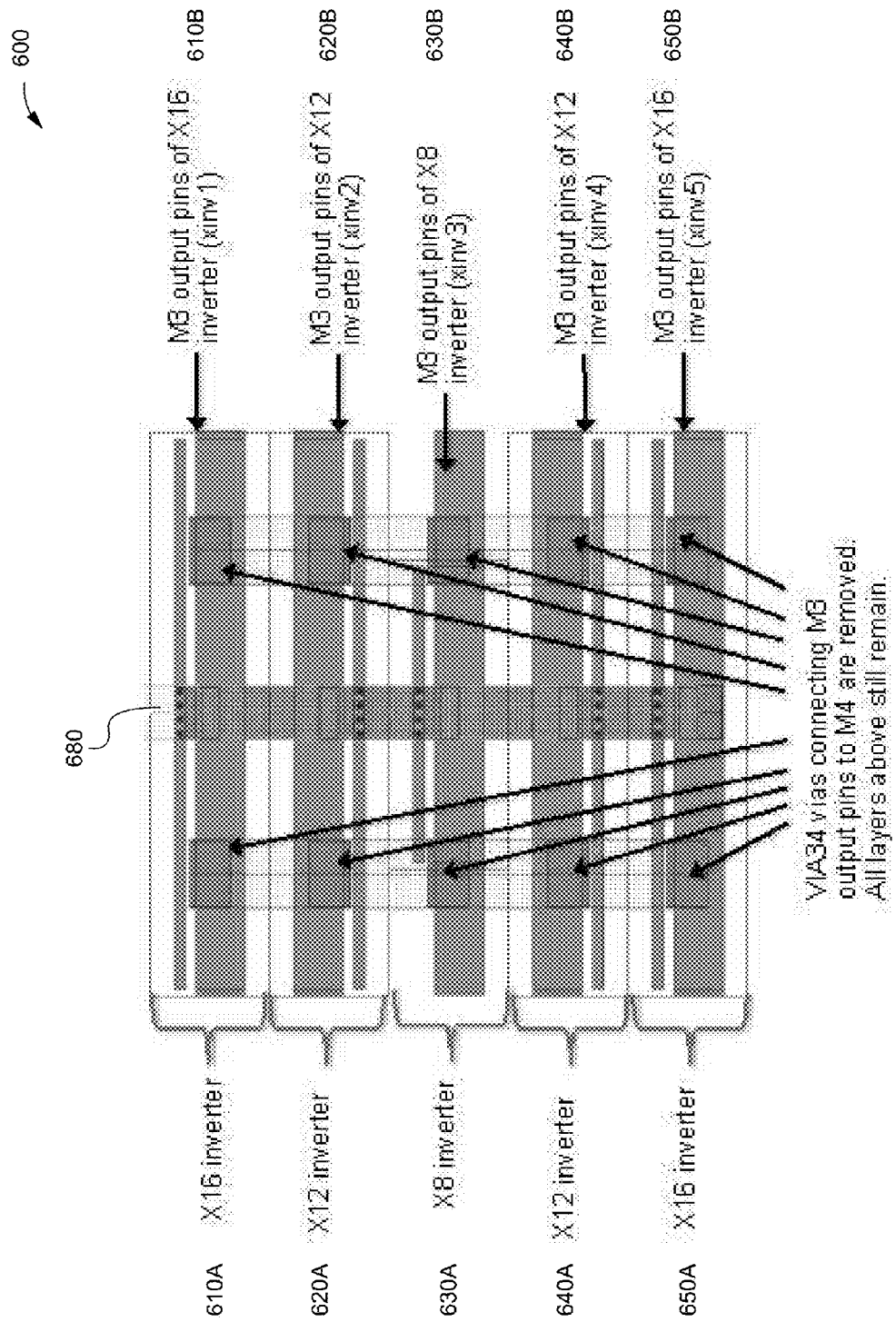

FIGS. 4-6 are layouts showing VIA34 programming of 64×, 32×, and 0× drive strength clock inverters, respectively, using the same (base) standard-size clock cells in M4 and output pins for each of the cells in M3. Each of the layouts shows a left-hand side that contains 16×, 12×, 8×, 12×, and 16× inverters in M4, a right-hand side that contains output pins of the respective inverters in M3, and vias between M3 and M4 for electrically coupling the inverters on the left-hand side to their respective output pins FIG. 4, for example, is a layout 400 with vias 480 programmed to connect all the M3 output pins (410B, 420B, 430B, 440B, 450B) to all the 16×, 12×, 8×, 12×, and 16× inverters (410A, 420A, 430A, 440A, 450A), thereby producing a clock signal on the output pins with a combined drive strength of 16×+12×+8×+12×+16×, or 64×. FIG. 5 is a layout 500 having output pins (510B, 520B, 530B, 540B, 550B) and inverters (510A, 520A, 530A, 540A, 550A), with vias 580 programmed to connect two M3 output pins (510B and 550B) to the outputs of the two corresponding 16× inverters (510A and 550A), thereby producing a clock signal with a combined drive strength of 16×+16×, or 32×. FIG. 6 is a layout 600 having output pins (610B, 620B, 630B, 640B, 650B) and inverters (610A, 620A, 630A, 640A, 650A), with vias 680 connecting the M3 output pins to the 16×, 12×, 8×, 12×, and 16× inverters removed, thereby producing a 0× (dummy) drive strength clock inverter. Those skilled in the art will recognize other VIA34 programming for combining clock elements to produce clock signals with other clock strengths.

Figure 7:
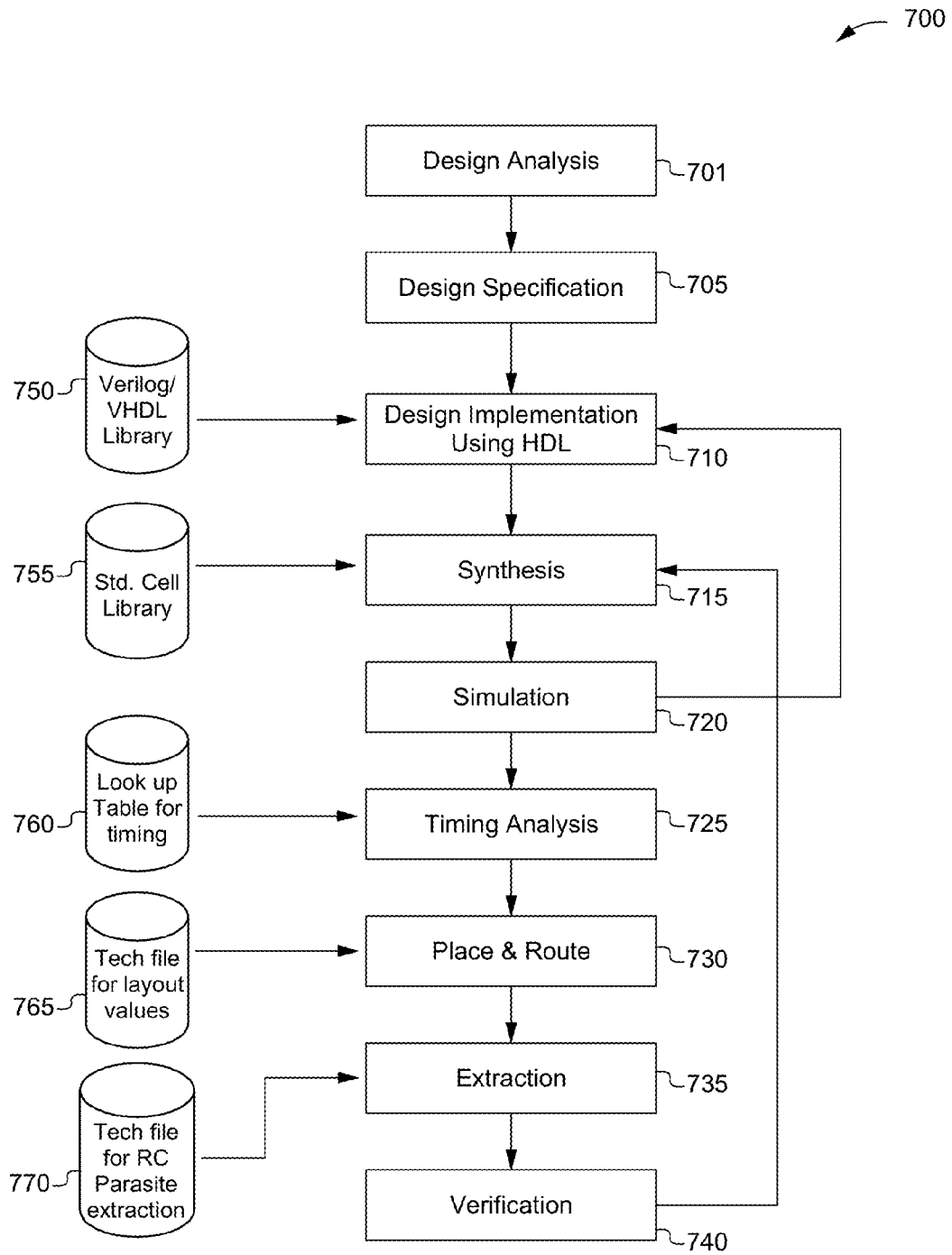
FIG. 7 is a flow chart of the steps of a digital design flow, including combining clock-driving elements in a clock-distribution network in accordance with one embodiment of the invention.

FIG. 7 illustrates a flow chart of the steps 700 of a digital design flow for a semiconductor device with corresponding hardware components, used in accordance with embodiments of the invention. The design analysis, design specification, and design implementation using a hardware-description language and a Verilog/VHDL library 750, occurs in the steps 701, 705, and 710, respectively. The synthesis step occurs in the step 715, using a standard cell library 755. In this step, which can include a number of sub-steps, building blocks of the components, including the clock distribution network and sequential components, are synthesized. The clock-distribution network is synthesized using only standard-size cells. At this stage, the logic circuits are determined. The output of the synthesis step 715 is a netlist, an ASCII file that indicates the devices and interconnections between them. The simulation occurs in the step 720, using the netlist to verify the design and, if not to specification, the process loops back to the step 710. Otherwise, the process continues to the timing analysis in the step 725 where, for example, skew is determined. The step 725 is followed by placement and routing in the step 730, extraction in the step 735, in which components that affect performance are extracted and examined, and the verification step 740, in which the device is fabricated or the design is reworked for optimization or modification. If the design must be modified, the process loops back to the step 720.

As shown in FIG. 7, the timing analysis step 725 accesses a Look-up Table for Timing 760, the placement-and-routing step 730 accesses a Tech file for layout values 765, and the extraction step 735 accesses a Tech File for RC parasitic extraction 770.

It will be appreciated that the steps 700 are merely illustrative of one embodiment of the invention. In other embodiments, other steps are added, some steps are combined, and the sequence of steps are performed in different orders, to name only a few modifications.

Figure 8:
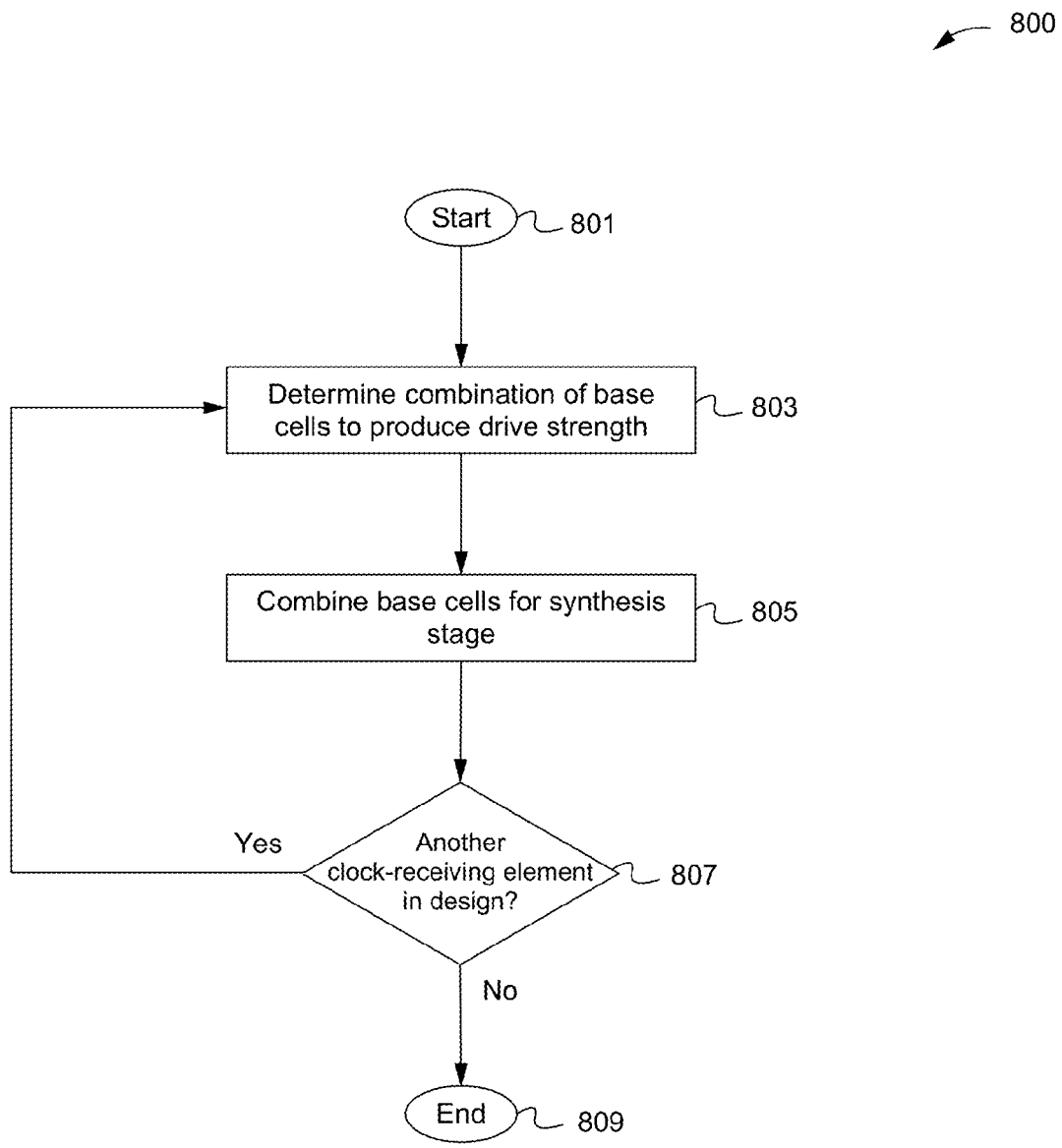
FIG. 8 is a flowchart of the steps of a process for combining standard-size clock-driving elements in accordance with one embodiment of the invention.

FIG. 8 shows the steps 800 for determining the standard-cell inverters stored in the standard cell library 755 in FIG. 7. At this stage in the process, the loads on each clock inverter (and thus the required or "target" drive strengths) have been determined, such as in the synthesis step 715, the verification step 740, or some other step. In the start step 801, a first clock-receiving element driven by a target drive strength is selected. In the step 803, combinations of standard-size macrocells stored in the standard cell library are determined to produce the appropriate clock drive strength signal, such as shown in Equation 1 above. In the step 805, these inverters are then combined or "ganged" to produce the target drive strengths using VIA programming, such as shown in FIGS. 4-6. In the step 807, the process determines whether there is another clock-receiving element in the design and, if so, loops back to the step 803; otherwise, the process ends in the step 809.

It will be appreciated that the steps 800 are merely illustrative of one embodiment of the invention. In other embodiments, other steps are added, some steps are combined, and the sequence of steps are performed in different orders, to name only a few modifications.

Figure 9B:
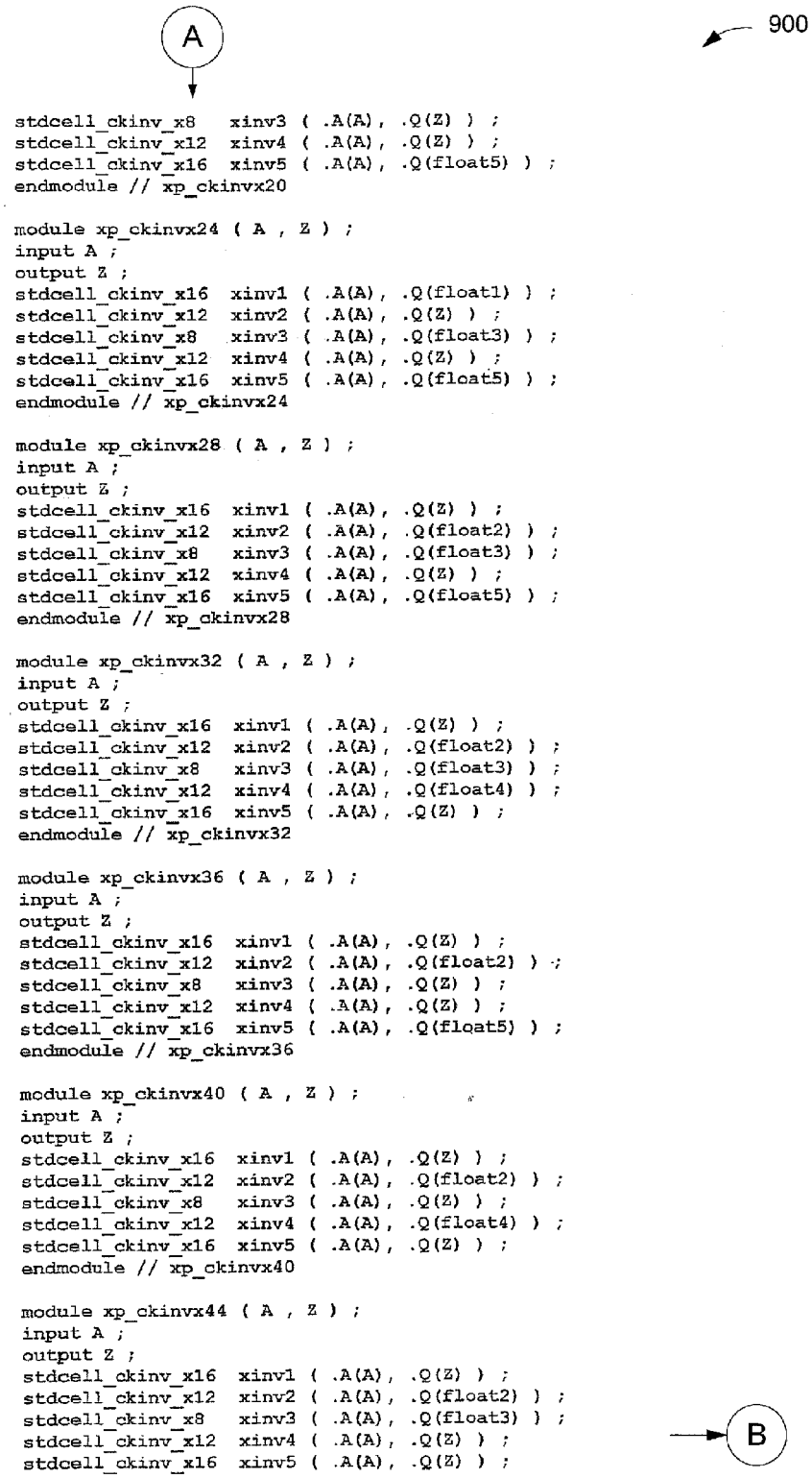

FIGS. 9A-C together illustrate a Verilog netlist 900 showing how a tune-able clock inverter is constructed in accordance with one embodiment of the invention. The netlist 900 illustrates the construction of binary tree with clock inverters with cross-links shorting the outputs of the clock inverters. The macrocells in this example are of drive strengths 0×, 8×, 12×, 16×, 20×, 24×, 28×, 32×, 36×, 40×, 44×, 48×, 52×, 56× and 64× using only the 8×, 12× and 16× drive strength clock inverter cells from a standard cell library. They are connected to form a clock station. A mesh clock distribution network consists of one or more of these clock stations together driving a clock mesh. In this example, the tune-able clock inverters are xp_ckinvx0, xp_ckinvx8, xp_ckinvx12, xp_ckinvx16, xp_ckinvx20, xp_ckinvx24, xp_ckinvx28, xp_ckinvx32, xp_ckinvx36, xp_ckinvx40, xp_ckinvx44, xp_ckinvx48, xp_ckinvx52, xp_ckinvx56, and xp_ckinvx64, which represent, respectively, the 0×, 8×, 12×, 16×, 24×, 28×, 32×, 36×, 40×, 44×, 48×, 52×, 56×, and 64× drive strengths. The base standard cells used to construct the tune-able clock inverters are two stdcell_ckinv_x16 cells, two stdcell_ckinv_x12 cells, and one stdcell_ckinv_x8 cell. The stdcell_ckinv_x16, stdcell_ckinv_x12, and stdcell_ckinv_x8 cells represent, respectively, the 16×, 12×, and 8× drive strength clock inverters from the standard cell library. The input net is "A" and the output net is "Z."

While the examples above show construction of tune-able inverters, the invention is able to be extended to other cells as well including buffers or any other logic gate. Tune-able buffers or clock-driving elements are also able to be constructed by combining a small set of base standard-cells and making their output connections programmable through only via changes.

Placing and Routing of the Standard-Sized Macrocells

Figure 10B:
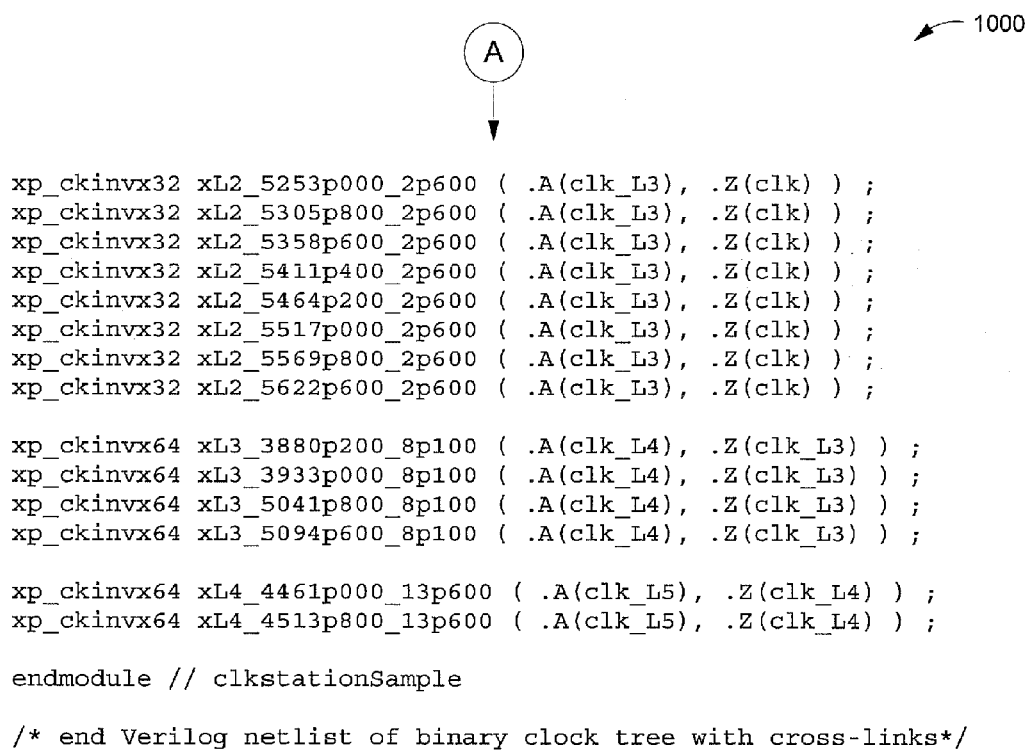

FIGS. 10A and 10B together illustrate a Verilog netlist 1000 of a binary clock tree with cross-links, used to illustrate how instance names are embedded with placement information, in accordance with one embodiment of the invention. The module "clkstationSample" is the clock station consisting of clock drivers using one of the tune-able clock inverters. The module "clkstationSample" has one input "clk_L5" and one output "clk". Output ports clk_L4, clk_L3 are also able to be added for the intermediate nodes of the clock distribution. The addition of these ports to the netlist help with tuning at every stage of the clock station. Also, the instance names of each clock inverter instantiated in the clock station have in them the level of the driver in the clock station and also physical X- and Y-coordinates of the placement of the driver. In this example, all instance names starting with xL2 signify the last (leaf) stage of the clock station. The xL2 drivers are driven by xL3 drivers which are in turn driven by xL4 drivers. The X-coordinate and the Y-coordinate are in the instance name following the level number of the driver. For example, the instance $$xp\_ckinvx64xL3\ 5094p600\ 8p100(.A(clk\_L4),Z(clk\_L3));$$

describes a 64× drive strength driver at level 3 at X coordinate 5094.6 and Y coordinate 8.1 with input net clk_L4 and output net clk_L3. The instance name (with level and physical co-ordinate information) plays a role in the layout and in the tuning flow, described below.

For layout of the clock station, the netlist is read into the PnR (Place-and-Route) tool and the physical coordinate information that is part of the cell is used to guide the placement. For example, the cell xL3_5094p600_8p100 is an instance of the macro-cell xp_ckinvx64 which consists of 5 cells xinv1, xinv2, xinv3, xinv4, xinv5. When the netlist is read into the PnR tool, the PnR tool will recognize the following five base cells xL3_5094p600_8p100/xinv1
xL3_5094p600_8p100/xinv2
xL3_5094p600_8p100/xinv3
xL3_5094p600_8p100/xinv4
xL3_5094p600_8p100/xinv5 instead of recognizing them as part of one physical cell. In order to place these five cells together, the placement information is embedded in the name of the instance to first place the cell xL3_5094p600_8p100/xinv5 centered at or some offset from the (X, Y) coordinate 5094.6, 8.1. Next, cell xL3_5094p600_8p100/xinv4 is placed one standard-cell row (or some integer multiple of a standard-cell row) above xL3_5094p600_8p100/xinv5. This is followed by xL3_5094p600_8p100/xinv3, xL3_5094p600_8p100/xinv2, xL3_5094p600_8p100/xinv1 all being placed on top of each other. Alternatively, the cells are able to be placed next to each other on the same row or keeping some cells in one row and other cells in another row. Any arrangement of cells is allowed as long as the cells do not overlap and the relative positioning of the base cells within each macrocell remains the same. This is required to make the routing of the macrocell deterministic. The relative placement of each of the base cells within the macrocell ensures that the input and output pin locations of the base cells are known.

Figure 11:
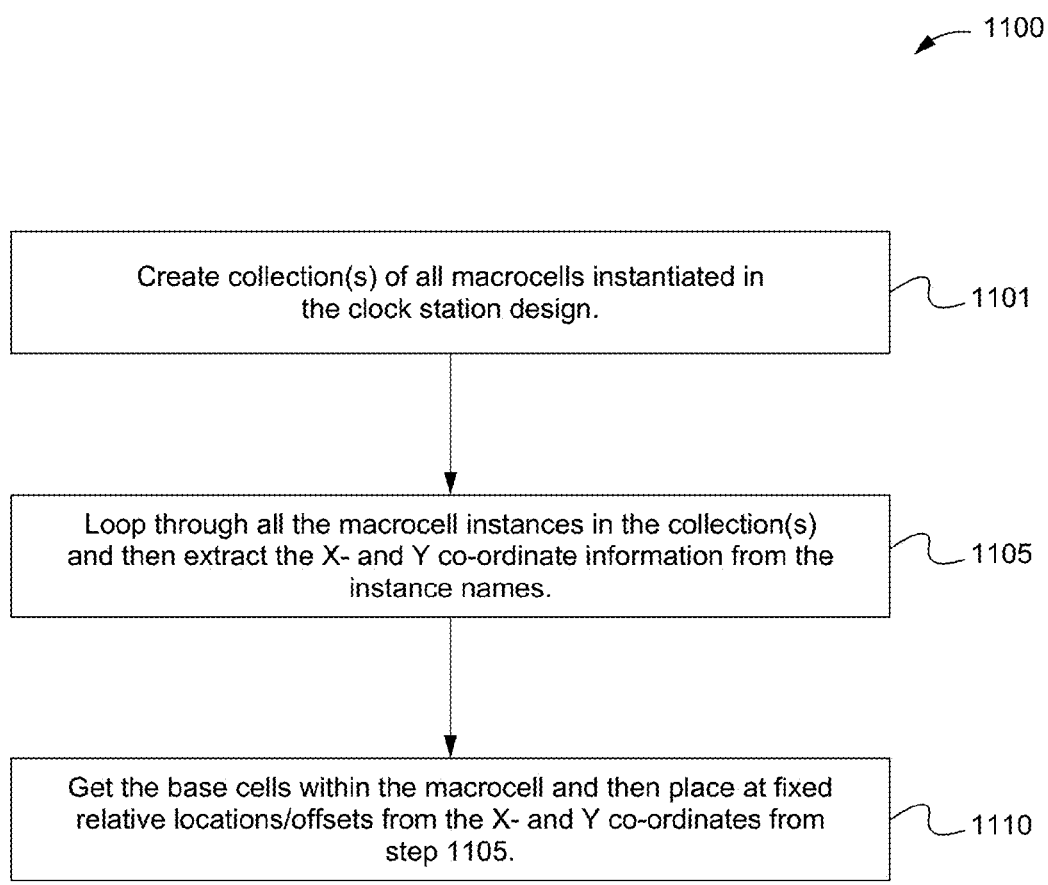
FIG. 11 is a flow chart of the steps for placing cells in a semiconductor layout in accordance with one embodiment of the invention.

FIG. 11 shows the steps 1100 of a process for placing all the base cells within a macrocell in accordance with one embodiment of the invention. In the step 1101, a collection of all the macrocells instantiated in the clock station design is created. Next, in the step 1105, the process loops through all the macrocell instances in the collection(s) and then extracts the (X,Y) coordinate information from the instance name. Next, in the step 1110, the base cells within the macrocell are retrieved and placed at a fixed relative locations/offsets from the (X,Y) coordinates determined in the step 1105.

Once all the cells are placed, they are uniquified and linked to the physical DB. In the IC Compiler PnR tool from Synopsys this is accomplished with the following commands:
 uniquify_fp_mw_cel
 link
 link_physical_library The routing of the inputs and outputs of the cells are also guided with help of the instance name and the Verilog netlist. This routing uses placement information and then connects the cells together. This is possible only because the placement of each of the base cells within the macrocells is at a known offset from the (X, Y) coordinates embedded in the instance name of the cell.

Figure 12:
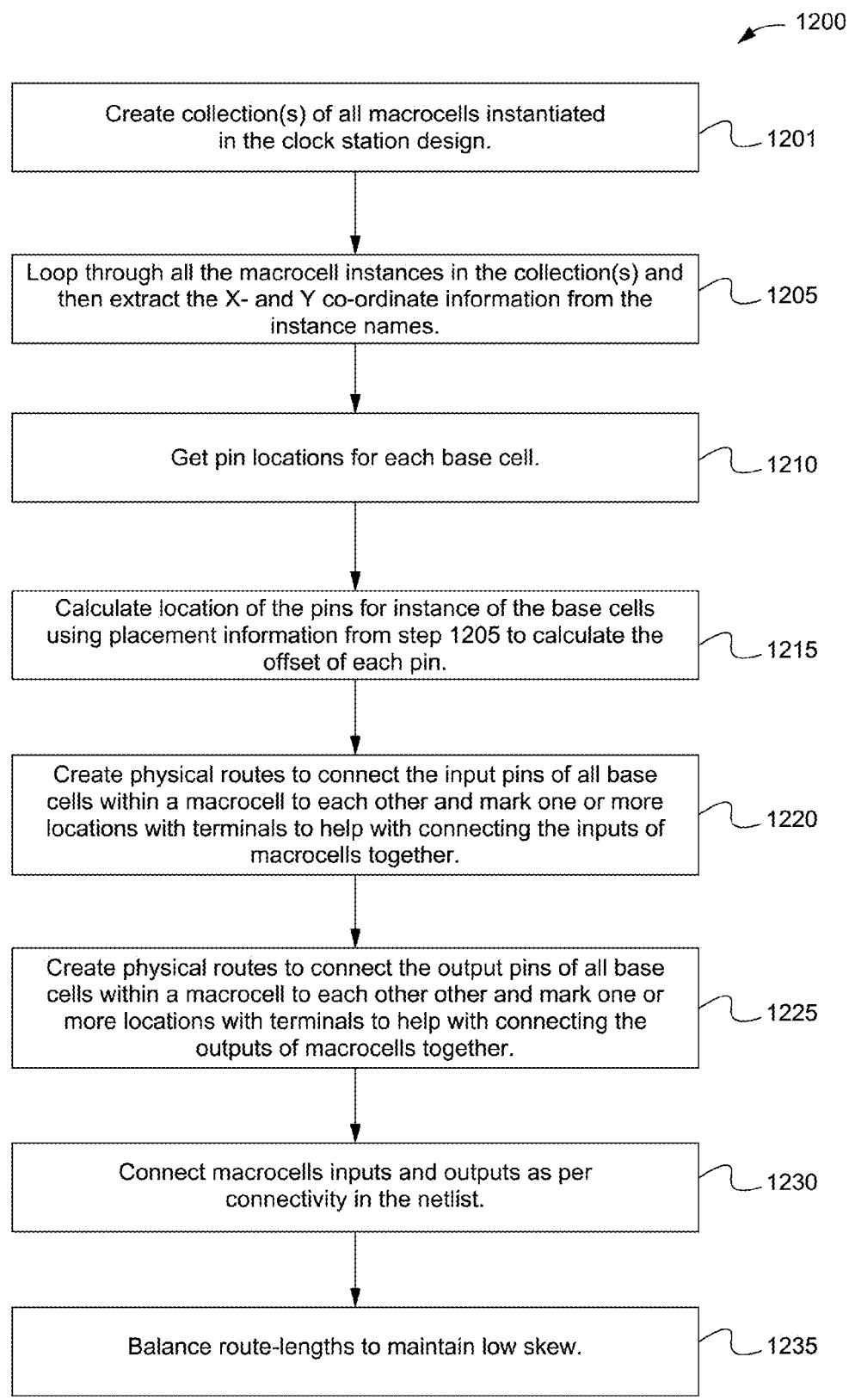
FIG. 12 is a flow chart of the steps for routing interconnections between cells in accordance with one embodiment of the invention.

FIG. 12 shows the steps 1200 of a process for routing in accordance with one embodiment of the invention. In the step 1201, a collection(s) of all macro-cells instantiated in the clock station design is created. Next, in the step 1205, the process loops through all the macrocell instances in the collection(s) and then extracts the (X,Y) coordinate information from the instance name. Next, in the step 1210, the pin locations for each base cell are retrieved. Next, in the step 1215, locations of the pins for instance of the base cells using placement information from the step 1205 are calculated to calculate the offset of each pin. Next, in the step 1220, physical routes are created to connect the input pins of all the base cells within a macrocell to each other and to mark one or more locations with terminals to help with connecting the inputs of macrocells together. Next, in the step 1225, physical routes are created to connect the output pins of all base cells within a macrocell to each other and mark one or more locations with terminals to help with connecting the outputs of macrocells together. Next, in the step 1230, macrocells inputs and outputs are connected as per connectivity in the netlist. Finally, in the step 1235, route lengths are balanced to maintain low skew.

In one embodiment, the steps 1100 and 1200 are performed during the step 730 of FIG. 7.

Figure 13:
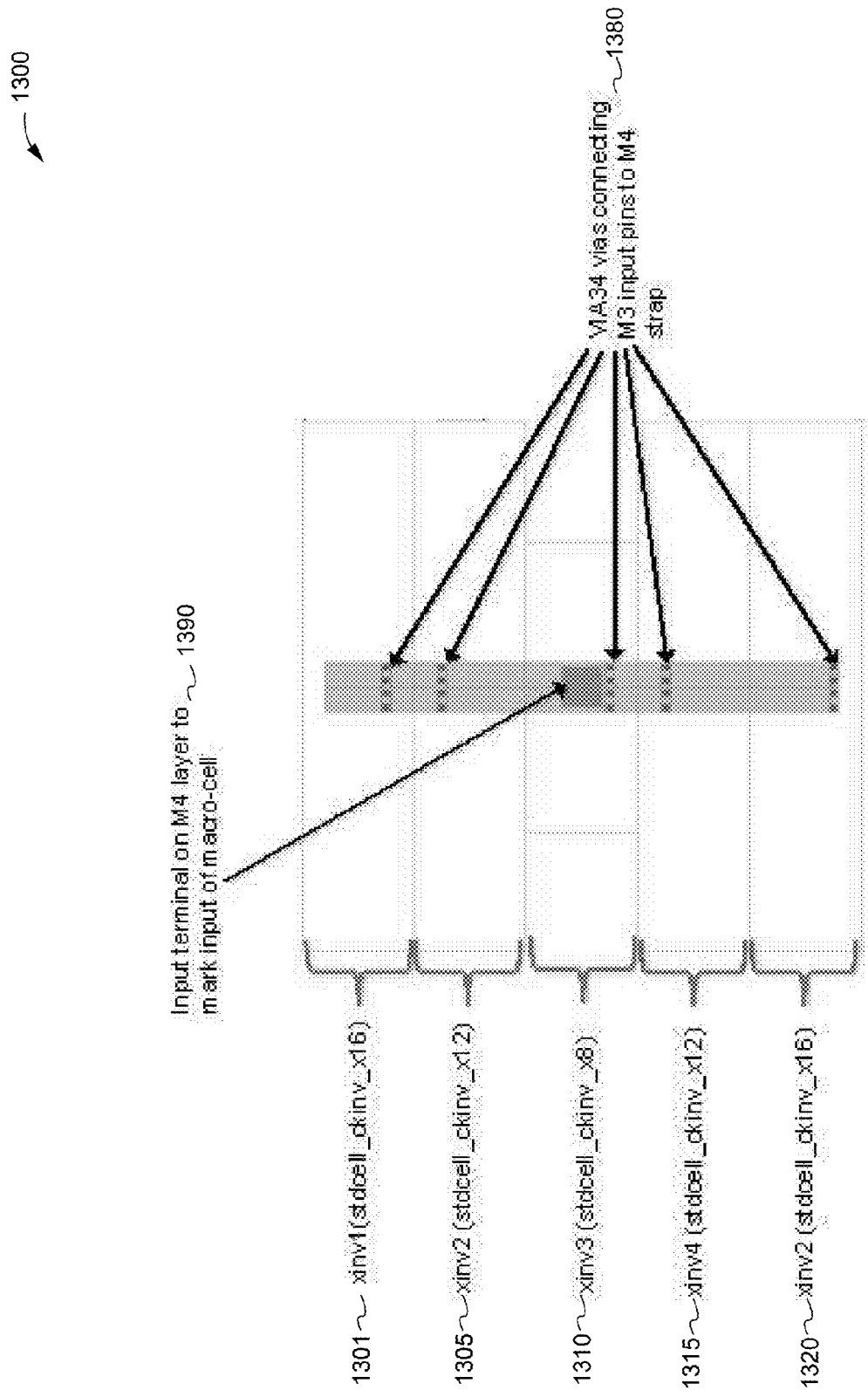
FIG. 13 is a schematic illustrating input routing for a macrocell in accordance with one embodiment of the invention.
Figure 14:
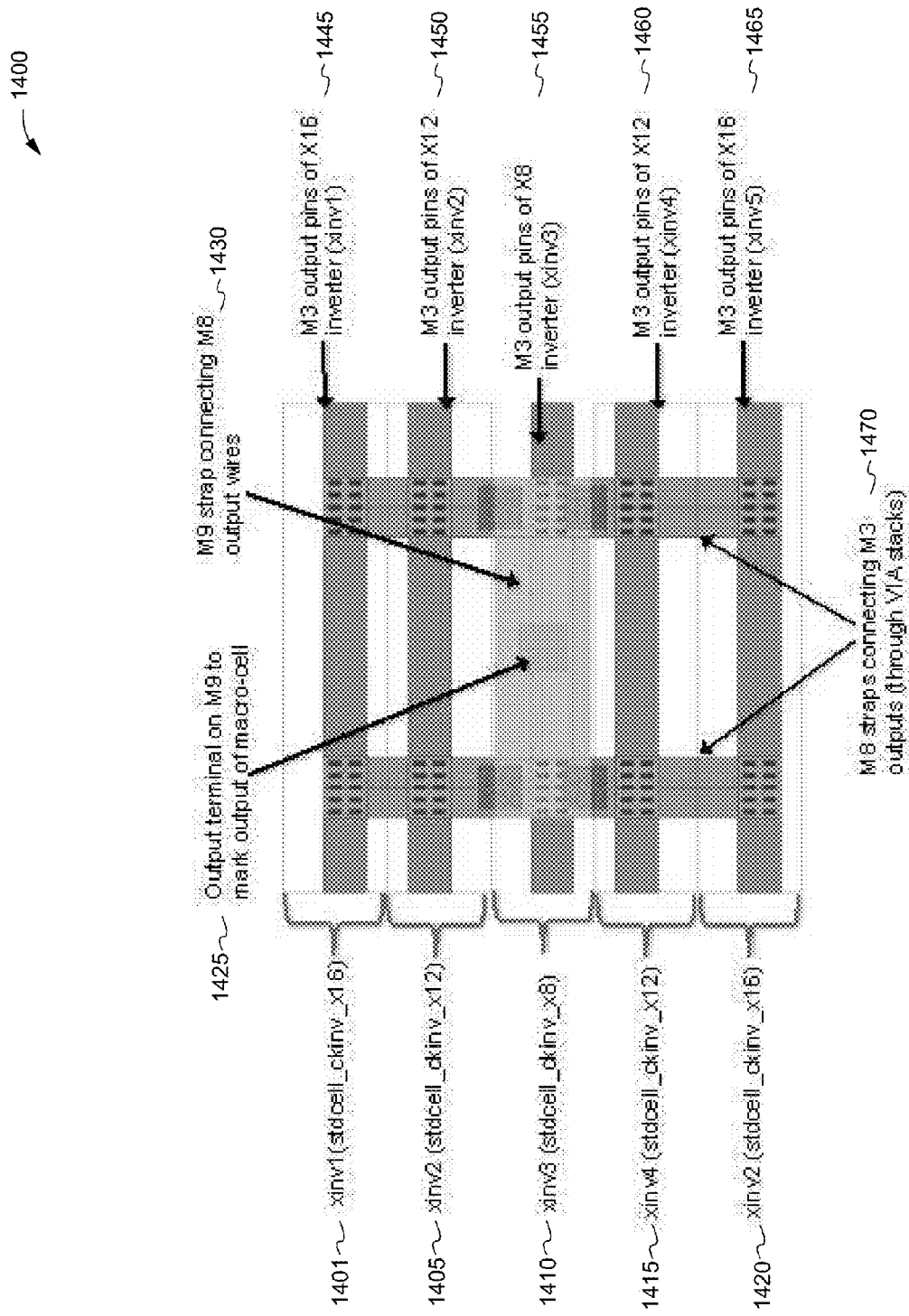
FIG. 14 is a schematic illustrating output routing for a macrocell in accordance with one embodiment of the invention.

FIGS. 13 and 14 are structures 1300 and 1400 used to illustrate input routing 1300 and output routing 1400, respectively, in accordance with one embodiment of the invention. The structure 1300 shows standard cells of drive strengths 16× (1301 and 1320), 12× (1305 and 1315), and 8× (1310), VIA34 vias (1380) connecting M3 input pins to an M4 strap, and an input terminal (1390) on M4 marked as an input of the macrocell. The structure 1400 shows standard-size cells of drive strengths 16× (1401 and 1420), 12× (1405 and 1415), and 8× (1410), output pins of the 16× inverters 1445 and 1465), 12× inverters (1450 and 1460), and 8× inverter (1455), M8 straps connecting M3 outputs through VIA stacks (1470), an M9 strap connecting M8 output wires (1430), and an output terminal on M9 (1425) marked as an output of the macrocell.

In the examples of FIGS. 13 and 14, the base cells in the macrocell are placed in a single column with each base cell placed on top of another. Alternative arrangements are also possible but require different input and output routing patterns. All macrocells will have the same (or similar) routing pattern since the placement of each base cell (and hence the input and output pins) within the macrocell is the same relative to the (X,Y) coordinate embedded in the instance name of the macrocell.

FIGS. 13 and 14 show how inverters are able to be placed and routed together using physical location information embedded in the instance names and have them logically behave like one macrocell, but be represented in the physical DB as multiple base cells. This structure is also able to be extended to other cells as well, including buffers or any other logic gate. Tune-able buffers or clock-driving elements can also be placed and routed in this way.

Tuning Clock Networks

In one embodiment of the invention, a clock network built of macrocells, which in turn consists of a small set of base cells, is tuned while the macrocells are broken into their base cells.

In one embodiment, the tuning is based on the following assumptions:
 A1. A soft-macro of the macrocell is created at the resistor-transistor-logic (RTL) stage.
 A2. The macrocells are placed and routed and a physical DB is available with placement and routing of the macrocells fixed.
 A3. The instance name of the macrocells instantiated in the clock network has embedded within it, level information (level in the clock tree) as well as a unique identifier (for example physical location can be used as a unique identifier).

Again, the macrocells for this example are shown in the netlist 900, and the netlist 1000 shows the clock binary clock tree with cross-links. As explained above, the instance names of each clock inverter instantiated in the clock station have in them the level of the driver in the clock station and also physical X and Y co-ordinates of the placement of the driver. Thus, the instance names are unique, as in the third assumption A3.

Figure 15:
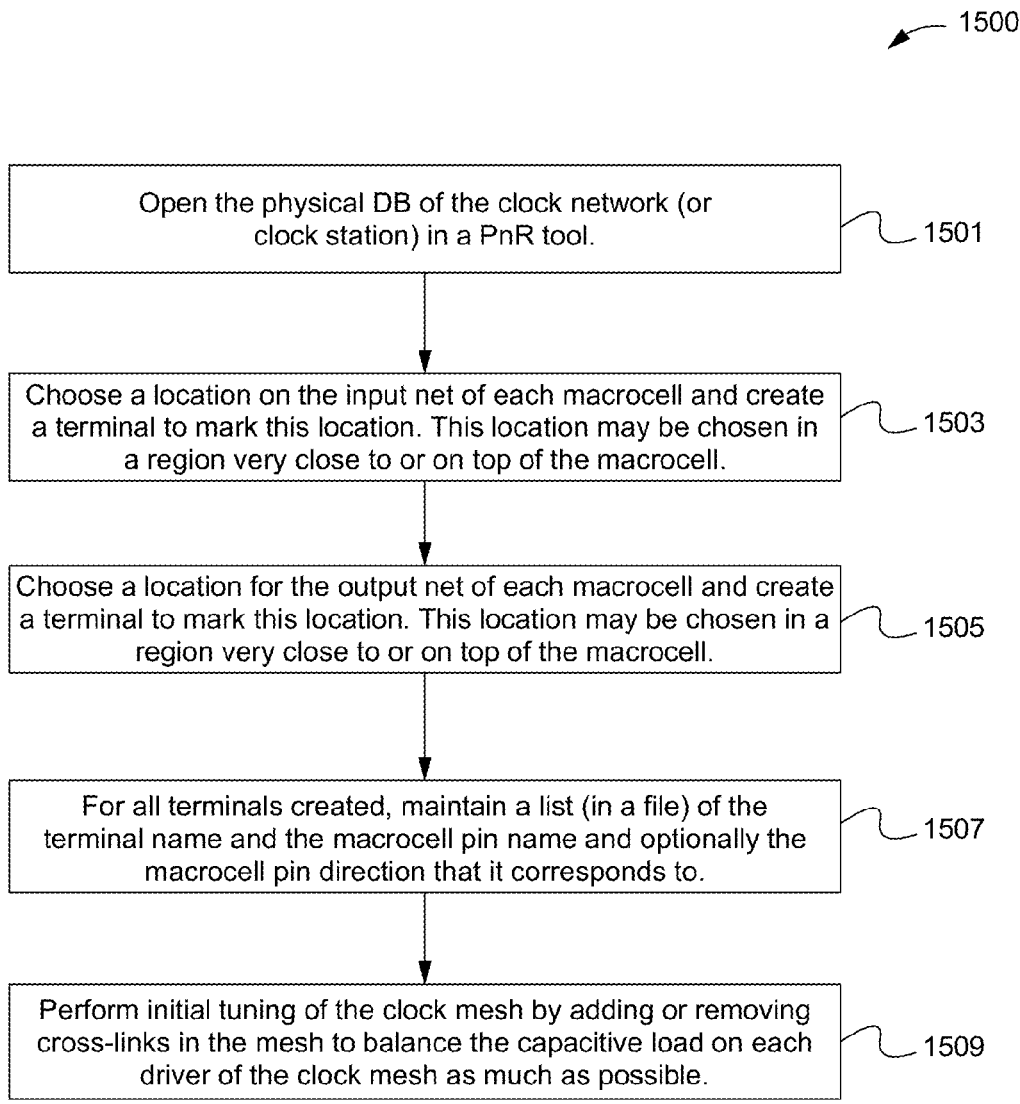
FIG. 15 is a flow chart of the steps of a process for preparing the physical DB of a placed-and-routed clock distribution network for tuning in accordance with one embodiment of the invention.

FIG. 15 shows the steps 1500 used to prepare the physical DB of the placed and routed clock distribution network for tuning in accordance with one embodiment of the invention. In the step 1501, the physical DB of the clock network (or clock station) is opened in a PnR tool. Next, in the step 1503, a location on the input net of each macrocell is chosen and a terminal is created to mark this location. Next, in the step 1505, a location on the output net of each macrocell is chosen and a terminal is created to mark this location. This location is able to be chosen in a region very close to or on top of the macrocell. Next, in the step 1507, for all the terminal created, a list of the terminal name and the macrocell pin name is maintained, such as in a file. Optionally, the directions of the macrocell pins are also maintained. Alternatively, this information is embedded in the terminal name when the terminal name is created. Physical location information is also able to be maintained. Finally, in the step 1509, the clock mesh is initially tuned by adding or removing cross-links in the mesh to balance the capacitive load on each driver of the clock mesh as much as possible. The initial tuning is able to be done without simulation, by just comparing wire lengths or estimated interconnect capacitance, to name only two such parameters, driven by each clock driver of the clock mesh. FIGS. 13 and 14 show the physical DB after the steps 1503 and 1505, respectively, in FIG. 15 have been performed.

After the step 1509, the physical wiring information (resistance and capacitance of the interconnect) is extracted using an extraction tool. The extraction tool is assumed to preserve the terminals that were created in the physical DB in steps 1505 and 1507. The extraction tool generates a netlist that is then used for simulating and tuning the clock network. Since, the macrocell is only created as a soft-macro and there is no physical layout view of the macro-cell on its own, the extraction tool will flatten the macrocell and generate a netlist with the base cells. Table 1 illustrates one example, the base cells of macrocell in an extracted netlist:

TABLE 1

XxL3_5905p600_8p100/xinv1 clk_L4:F44 clk L3:F52 VDD VSS std_cell_ckinvx16
XxL3_5905p600_8p100/xinv2 clk_L4:F80 clk L3:F87 VDD VSS std cell_ckinvx12
XxL3_5905p600_8p100/xinv3 clk_L4:F09 clk L3:F14 VDD VSS std cell_ckinvx8
XxL3_5905p600_8p100/xinv4 clk_L4:F30 clk L3:F37 VDD VSS std cell_ckinvx12
XxL3_5905p600_8p100/xinv5 clk_L4:F59 clk L3:F67 VDD VSS std cell_ckinvx16

During tuning of the clock distribution network that uses these macro-cells, these cells must be recombined during circuit simulation. Without the ability to recombine the base cells back to the macrocells the tuning flow will involve relaying out and re-extracting the clock distribution network. This can make the tuning flow unwieldy and limit the number of iterations. Table 2 illustrates this, showing how the base cells of Table 1 are collapsed into a macrocell for tuning purposes:

TABLE 2

XxL3_5905p600_8p100 clk_L4_in1 clk_L3_out1 VDD VSS xp_ckinv64

The terminals created in the 1503 and 1505 are used to connect the collapsed macro-cell in the extracted netlist. In the example shown in Table 2, clk_L4_in1 is a terminal created in step 1503 and clk_L3_out1 is a terminal created in step 1505. The terminals are chosen such that they lie (physically) on top of or very close to the macrocell. This information is available from step 1507 (which generates a file mapping each terminal to a macrocell pin name or contains physical locations of the terminals). Alternatively, this information is embedded in the terminal name itself. In one embodiment, a script is used to do this collapsing of macrocells to be tuned. Simultaneously, files are able to be generated for creating stimulus to the clock network netlist and for creating measurement statements to measure various circuit parameters at the inputs and outputs of the macrocell. Since, the inputs and outputs of every macrocell are marked with a terminal (e.g., in the steps 1503 and 1505), measurement statements are able to be generated at these terminals. As only some examples, measurements include delay, slew, charge, current, or any combination of these parameters.

In one embodiment, the clock network is tuned by changing the effective drive strength of some macrocells in order to balance delays and slews at the output of all the drivers at the same level in the clock distribution. This tuning is done with the help of a circuit simulation tool (for example Hspice). The clock network is also able to be tuned by comparing and trying to equalize one or more of the parameters measured during circuit simulation. As only some examples, these parameters include delay, slew, current or charge. In the following example, slew is used as the parameter, though any other parameter of combinations of parameters are also able to be used.

In this example, "Target_slew" is the target slew value for a particular macrocell's output and "Current_slew" is the measured slew from circuit simulation at the macrocell's output. "Current_size" is the current size (or drive strength) of the macrocell. Equation (2) is used to derive a new size for the macrocell to tune the clock network based on slew measurements:

$$\text{New\_size} = \text{Current\_size} * (1 + (\text{Current\_slew} - \text{Target\_slew}) / (\text{Target\_slew})) \quad \text{Equation (2)}$$

In different embodiments a different equation is used to derive a new size for the macrocell, such as given by Equation (3):

$$\text{New\_size} = \text{Current\_size} * (1 + (\text{Current\_slew} - \text{Target\_slew}) / (\text{Current\_slew})) \quad \text{Equation (3)}$$

In an alternative embodiment, a table look-up is used to look up the measured slew value and determine new cell size from the table. Different cell sizes are able to be associated with different range of slew values.

Once, the new cell sizes are calculated, the new cell sizes are incorporated in the netlist used for simulation. The clock network circuit with the new cell sizes is then simulated again and the impact of the cell sizing is verified. If the slew (or other measured value) is still not at the target, then cell resizing is done again. This is repeated until an exit criterion is met. As some examples, exit criterion include one or more the following exit criteria:

New_size=Current_size for all macrocells.

Slew (or any other measured variable) is within a user-defined range from the target value.

Number of iterations reaches a user-defined limit.

Those skilled in the art will recognize other exit criteria and combinations of exit criteria that are able to be used in accordance with the principles of the invention.

Once, the exit criterion is met, all the new sizes are updated in the circuit netlist for simulation as well as the RTL netlist for the clock network. The new cell sizes will impact the layout (specifically the routing) in the clock network. The revised RTL netlist is used to guide the layout changes.

Hardware Components

Figure 16:
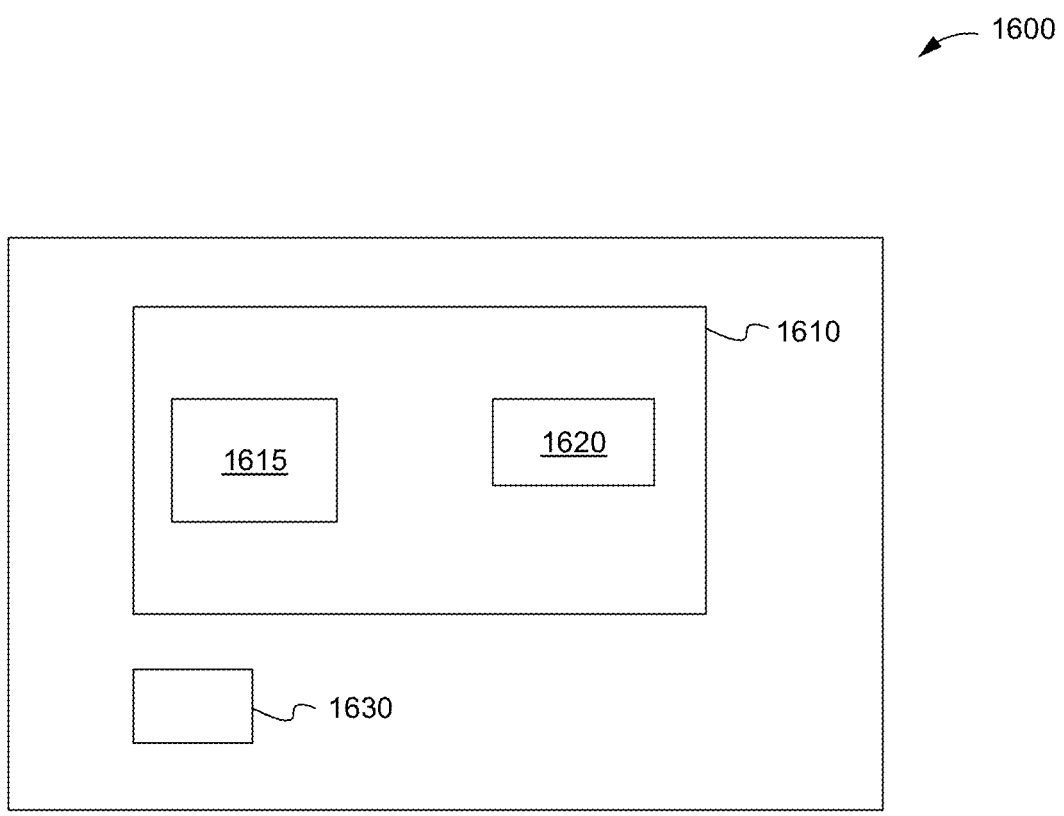
FIG. 16 is a block diagram of a design tool for performing the digital design flow in accordance with one embodiment of the invention.

FIG. 16 is a block diagram of an electronic design tool 1600 in accordance with one embodiment of the invention. Referring to FIGS. 7, 8, 11, 12, and 15 the electronic design tool 1600 includes a processor 1630 and a memory 1610. The memory 1610 stores a computer-readable medium containing computer-executable instructions 1615 for performing the steps 700, 800, 1100, 1200, and 1500 and an area 1620 containing the data 750, 755, 760, 765, and 770.

In operation, an electronic design tool is used to fabricate a semiconductor device that includes a clock distribution network. The loads on the sequential elements on the clock distribution network are determined and the drive strengths are determined to reduce skew on the clock distribution network. The inverters on the clock distribution network are fabricated from standardized or "base" cells from a standard cell library, thereby reducing the cost and manufacturing time for fabricating the clock distribution network and thus the semiconductor device as a whole. Advantageously, these base cells can be used to "tune" the drive strengths within a range of values.

During placement and routing, macrocells containing the base cells are instantiated, and the (X,Y) coordinate information are extracted from the instance name. The base cells within the macrocells are then placed at fixed relative locations/offsets from the (X,Y) coordinates. Next, the macrocells are routed by generating collections of macrocells instantiated in the clock-station design, extracting (X,Y) coordinate information from the instance name, getting the pin locations for each base cell, calculating locations of the pins using the (X,Y) coordinate information, creating physical routes to connect input pins to base cells within a macrocell to each other and marking one or more locations with terminals to help connecting the inputs of the macrocells together, generating physical routes to connect the output pins of all the base cells within a macrocell to each other and marking one or more locations with terminals to help with connecting the outputs of macrocells together, connecting macrocell inputs and outputs per connectivity in the netlist, and balancing route lengths to maintain low skew.

To prepare the physical DB of the placed-and-routed clock distribution network for tuning, locations of the input and output netlists of each macrocell are created and terminals are chosen to mark these locations. For all the terminals created, and a list of the names of the terminals, the macrocell pins, and, optionally, directions of the pins are stored, preferably in a file. Alternatively, the information is embedded in the terminal name when created. Physical location is also able to be included. Next, the clock mesh is initially tuned by adding or removing cross-links in the mesh to balance capacitive loads on each driver of the clock mesh. This initial tuning is able to be performed merely by comparing wire lengths or estimated interconnect capacitance driven by each driver in the clock mesh.

Methods and apparatus for combining standard-size cells and placing and routing clock stations in accordance with the invention are described in U.S. patent application Ser. No. 14/141,076, filed Dec. 26, 2013 and entitled "System for and Method of Combining CMOS Inverters of Multiple Drive Strengths to Create Tune-able Clock Inverters of Variable Drive Strengths in Hybrid Tree-Mesh Clock Distribution Networks," by N. Jayakumar et al., and U.S. patent application Ser. No. 14/141,096, filed Dec. 26, 2013 and entitled "System for and Method of Placing and Routing Clock Stations Using Variable Drive-Strength Clock Drivers Built Out of a Smaller Subset of Base Cells for Hybrid Tree-Mesh Clock Distribution Networks," by N. Jayakumar et al., both of which are incorporated by reference in their entireties.

While this description explains different embodiments of the invention, it will be appreciated that these embodiments are able to be combined in any number of combinations. The embodiments given above are shown merely for illustration and are not meant to limit the scope of the invention. It will be readily apparent to one skilled in the art that other modifications may be made to the embodiments without departing from the spirit and scope of the invention as defined by the appended claims.

We claim:

1. A method of tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the method comprising:
   determining a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit;
   representing each of the macrocells within a physical database as a group of the base cells that form the macrocell configured such that the group logically behaves as if the base cells were a single macrocell;
   choosing an input and an output of each of the macrocells by marking a location of an input pin of the input pins of the base cells of the macrocell and marking a location of an output pin of the output pins of the base cells of the macrocell and generating terminals at the marked locations;
   associating the terminals with the macrocells upon which the terminals are located in a table such that each macrocell is associated with a pair of the terminals that indicate the input and the output of the macrocell; and
   tuning the integrated circuit by adjusting the drive strength of one or more of the macrocells based on a size of the capacitive load that is driven by the macrocell in order to balance a parameter of the clock network, wherein the parameter is measured from one or both of the terminals of the macrocell.

2. The method of claim 1, further comprising opening a physical DB of the integrated circuit using a place-and-route (PnR) tool.

3. The method of claim 1, wherein the clock network comprises one of a clock mesh, a clock-tree mesh, and a hybrid tree-mesh.

4. The method of claim 1, wherein tuning the integrated circuit comprises any combination of adding and removing the cross-links.

5. The method of claim 1, wherein each of the macrocells contains only one or more corresponding standard-size base cells.

6. The method of claim 5, further comprising flattening each of the macrocells to generate a netlist containing the corresponding base cells.

7. The method of claim 6, wherein tuning the integrated circuit comprises recombining the base cells into the corresponding macrocells during circuit simulation using terminal names of the terminals.

8. The method of claim 7, further comprising storing the terminal names in a file.

9. The method of claim 7, further comprising embedding the terminal names in the corresponding terminal names.

10. The method of claim 9, further comprising embedding physical location information of a terminal in a corresponding terminal name.

11. The method of claim 1, further comprising introducing stimulus to a netlist of the integrated circuit and measuring circuit parameters at inputs and outputs of the macrocells.

12. The method of claim 11, wherein tuning comprises equalizing one or more parameters measured during simulation of the integrated circuit.

13. The method of claim 12, wherein the one or more parameters comprise delay, slew, current, charge, or any combination thereof.

14. The method of claim 13, wherein tuning comprises resizing the macrocells until an exit criterion is met.

15. The method of claim 14, wherein the exit criterion comprises a size of the macrocells equals a target size, measured slew is within a pre-determined range, a number of resizings has reached a pre-determined limit, or any combination thereof.

16. A method of tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the method comprising:
   determining a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit; and
   tuning the integrated circuit by resizing one or more of the macrocells in order to balance a slew of the clock network, wherein resizing is based on a formula $$\text{New\_size} = \text{Current\_size} * (1 + (\text{Current\_slew} - \text{Target\_slew}) / (\text{Target\_slew}))$$

wherein New_size is a new drive strength of a macrocell, Current_size a current drive strength of the macrocell, Current_slew is a current slew, and Target_slew is a pre-determined target slew.

17. A method of tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the method comprising:
   determining a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit; and
   tuning the integrated circuit by resizing one or more of the macrocells in order to balance a slew of the clock network, wherein resizing is based on a formula $$\text{New\_size} = \text{Current\_size} * (1 + (\text{Current\_slew} - \text{Target\_slew}) / (\text{Current\_slew}))$$

wherein New_size is a new drive strength of a macrocell, Current_size a current drive strength of the macrocell, Current_Slew is a current slew, and Target_slew is a pre-determined target slew.

18. A system for tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the system comprising:
   a processor;
   a synthesis module configured to:
      determine a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit; and
      represent each of the macrocells within a physical database as a group of the base cells that form the macrocell configured such that the group logically behaves as if the base cells were a single macrocell;
   a place-and-route module configured to:
      choose an input and an output of each of the macrocells by marking a location of an input pin of the input pins of the base cells of the macrocell and marking a location of an output pin of the output pins of the base cells of the macrocell;
      generate terminals at the marked locations; and
      associate the terminals with the macrocells upon which the terminals are located in a table such that each macrocell is associated with a pair of the terminals that indicate the input and the output of the macrocell; and
   a verification module configured to tune the integrated circuit by adjusting the drive strength of one or more of the macrocells based on a size of the capacitive load that is driven by the macrocell in order to balance a parameter of the clock network, wherein the parameter is measured from one or both of the terminals of the macrocell.

19. The system of claim 18, further comprising a macrocell library coupled to the synthesis module, wherein the macrocell library contains only standard-size base cells.

20. The system of claim 18, wherein the clock network comprises one of a clock mesh, a clock-tree mesh, and a hybrid tree-mesh.

21. The system of claim 18, wherein the synthesis module is further configured to flatten each of the macrocells to generate a netlist containing the corresponding base cells, and the verification module is further configured to recombine the base cells into the corresponding macrocells during circuit simulation using terminal names of the terminals.

22. The system of claim 21, further comprising a simulation module configured to introduce stimulus to a netlist of the integrated circuit and measure circuit parameters at inputs and outputs of the macrocells.

23. The system of claim 22, wherein the synthesis module is further configured to tune the integrated circuit by equalizing one or more parameters measured during simulation of the integrated circuit.

24. The system of claim 23, wherein the one or more parameters comprise delay, slew, current, charge, or any combination thereof.

25. The system of claim 24, wherein the synthesis module is configured to tune the integrated circuit by resizing the base cells until an exit criterion is met.

26. The system of claim 25, wherein the exit criterion comprises a size of the macrocells equals a target size, measured slew is within a pre-determined range, a number of resizings of the macrocells has reached a pre-determined limit, or any combination thereof.

27. The system of claim 25, wherein resizing the macrocells is based on a circuit simulation parameter.

28. The system of claim 27, wherein the circuit simulation parameter comprises delay, slew, current, charge, or any combination thereof.

29. A system for tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the system comprising:

a synthesis module configured to determine a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit; and a verification module configured to tune the integrated circuit by resizing one or more of the macrocells in order to balance a slew of the clock network, wherein resizing is based on a formula $$\text{New\_size} = \text{Current\_size} * (1 + (\text{Current\_slew} - \text{Target\_slew}) / (\text{Target\_slew}))$$

wherein New_size is a new drive strength of a macrocell, Current_size a current drive strength of the macrocell, Current_slew is a current slew, and Target_slew is a pre-determined target slew.

30. A system for tuning an integrated circuit including a plurality of capacitive loads and a clock network, wherein the clock network includes a spine, one or more supporting ribs coupled to the spine, a plurality of base cells coupled to the ribs and one or more cross-links coupling pairs of the base cells that are on different ones of the ribs together, the system comprising:

a synthesis module configured to determine a collection of macrocells, wherein each of the macrocells is formed by one or more of the base cells and instantiated in the integrated circuit, wherein each of the macrocells have a drive strength determined by one or more base cells that form the macrocell, each of the base cells have an input pin and an output pin, and each of the macrocells are for driving one of the capacitive loads on the integrated circuit; and a verification module configured to tune the integrated circuit by resizing one or more of the macrocells in order to balance a slew of the clock network, wherein resizing is based on a formula $$\text{New\_size} = \text{Current\_size} * (1 + (\text{Current\_slew} - \text{Target\_slew}) / (\text{Current\_slew}))$$

wherein New_size is a new drive strength of a macrocell, Current_size a current drive strength of the macrocell, Current_Slew is a current slew, and Target_slew is a pre-determined target slew.

\* \* \* \* \*